US010522006B2

(12) United States Patent
Alexander

(10) Patent No.: US 10,522,006 B2
(45) Date of Patent: Dec. 31, 2019

(54) METHODS AND SYSTEMS FOR INTERACTIVE GAMING

(71) Applicant: Erik Alexander, Minnetonka, MN (US)

(72) Inventor: Erik Alexander, Minnetonka, MN (US)

( * ) Notice: Subject to any disclaimer, the term of this patent is extended or adjusted under 35 U.S.C. 154(b) by 0 days.

(21) Appl. No.: 16/243,894

(22) Filed: Jan. 9, 2019

(65) Prior Publication Data

US 2019/0213840 A1 Jul. 11, 2019

Related U.S. Application Data

(60) Provisional application No. 62/615,166, filed on Jan. 9, 2018.

(51) Int. Cl.
*A63F 13/00* (2014.01)
*G07F 17/00* (2006.01)
*G07F 19/00* (2006.01)
*G07F 17/32* (2006.01)

(52) U.S. Cl.
CPC ...... *G07F 17/3276* (2013.01); *G07F 17/3244* (2013.01)

(58) Field of Classification Search
None
See application file for complete search history.

(56) References Cited

U.S. PATENT DOCUMENTS 7,684,874 B2 * 3/2010 Schlottmann ........... G07F 17/32 700/9
8,414,387 B1 * 4/2013 Paradise ............. G07F 17/3276 463/25
9,373,223 B1 * 6/2016 Webb .................... G07F 17/323
9,430,905 B2 * 8/2016 Webb .................. G07F 17/3258
9,633,513 B2 * 4/2017 Webb .................. G07F 17/3258
9,649,564 B2 * 5/2017 Paradise ................. A63F 13/00
9,824,540 B2 * 11/2017 Webb .................. G07F 17/3258
2003/0045358 A1 * 3/2003 Leen ....................... G07F 17/32 463/42

(Continued)

OTHER PUBLICATIONS

International Search Report and Written Opinion of the International Searching Authority for Application No. PCT/US2019/12923 dated Mar. 22, 2019 (12 pages).

*Primary Examiner* — Milap Shah
(74) *Attorney, Agent, or Firm* — Dicke, Billig & Czaja, PLLC

(57) ABSTRACT

A computer implemented interactive gaming tournament system includes generating match content in response to a request inquiry from a user device that is associated with a user, the match content includes payment attribute information and tournament attribute information, content is generated for the user device that includes the payment attribute information and tournament attribute information. The system includes sending a request for validation to a payment service in response to an entrance request from the user device, the entrance request includes selected tournament attribute information. The system includes sending population content based on the selected tournament attribute information in response to receiving validation content from the payment service, the validation content includes confirmation that a user account associated with the user contains funds that are equal to or greater than a fee associated with the selected payment attribute information.

20 Claims, 22 Drawing Sheets

(56) References Cited

U.S. PATENT DOCUMENTS

| | | | | |
|---|---|---|---|---|
| 2004/0224773 | A1* | 11/2004 | Sham | G06Q 30/02 463/42 |
| 2005/0043089 | A1* | 2/2005 | Nguyen | A63F 13/12 463/29 |
| 2005/0043094 | A1* | 2/2005 | Nguyen | G07F 17/32 463/42 |
| 2005/0102047 | A1* | 5/2005 | Ottofy | G07F 17/32 700/91 |
| 2006/0241795 | A1* | 10/2006 | Weingardt | G07F 17/32 700/91 |
| 2007/0129147 | A1* | 6/2007 | Gagner | G07F 17/32 463/42 |
| 2008/0234036 | A1* | 9/2008 | Reddicks | G07F 17/32 463/25 |
| 2008/0254883 | A1* | 10/2008 | Patel | G07F 17/3267 463/31 |
| 2008/0254893 | A1* | 10/2008 | Patel | G07F 17/3267 463/42 |
| 2009/0069092 | A1* | 3/2009 | Kelly | G06Q 30/02 463/42 |
| 2009/0069093 | A1* | 3/2009 | Kelly | G07F 17/32 463/42 |
| 2009/0318219 | A1* | 12/2009 | Koustas | G07F 17/32 463/23 |
| 2009/0325715 | A1* | 12/2009 | Kelly | G07F 17/32 463/42 |
| 2011/0014964 | A1* | 1/2011 | Crowder, Jr. | G07F 17/32 463/13 |
| 2011/0077066 | A1* | 3/2011 | Garibaldi | A63F 13/828 463/4 |
| 2011/0256913 | A1* | 10/2011 | Ford | G07F 17/32 463/6 |
| 2014/0171182 | A1* | 6/2014 | Versaci | H04L 67/38 463/25 |
| 2015/0094135 | A1* | 4/2015 | Hedrick | G07F 17/32 463/25 |
| 2015/0209679 | A1* | 7/2015 | Givant | A63F 13/828 463/25 |
| 2016/0027260 | A1* | 1/2016 | Pierce | G07F 17/3237 463/7 |
| 2016/0036901 | A1 | 2/2016 | Kim | |
| 2016/0110960 | A1 | 4/2016 | Paradise et al. | |
| 2017/0098348 | A1* | 4/2017 | Odom | G07F 17/3288 |
| 2017/0106290 | A1 | 4/2017 | Pierce et al. | |

* cited by examiner

400

500

600

1400

| | 1401 Teams | 1402 Payouts | 1403 First Place | 1404 Second Place | 1405 Third Place | 1406 Fourth Place |
|---|---|---|---|---|---|---|
| 1411 / 1407 | 3 | 1 | 100.00% | | | |
| | 4 | 1 | 100.00% | | | |
| | 5 | 1 | 100.00% | | | |
| | 6 | 1 | 100.00% | | | |
| | 7 | 1 | 100.00% | | | |
| 1408 | 8 | 2 | 70.00% | 30.00% | | |
| | 9 | 2 | 70.00% | 30.00% | | |
| | 10 | 2 | 70.00% | 30.00% | | |
| | 11 | 2 | 70.00% | 30.00% | | |
| 1409 | 12 | 3 | 60.00% | 30.00% | 10.00% | |
| | 13 | 3 | 60.00% | 30.00% | 10.00% | |
| | 14 | 3 | 60.00% | 30.00% | 10.00% | |
| | 15 | 3 | 60.00% | 30.00% | 10.00% | |
| | 16 | 3 | 60.00% | 30.00% | 10.00% | |
| 1410 | 17 | 4 | 50.00% | 25.00% | 15.00% | 10.00% |
| | 18 | 4 | 50.00% | 25.00% | 15.00% | 10.00% |
| | 19 | 4 | 50.00% | 25.00% | 15.00% | 10.00% |

FIG. 14

1500

1508, 1509, 1510, 1511, 1512, 1513, 1514, 1515

| 1501 Players | 1502 Payouts | 1503 1st Place | 1504 2nd Place | 1505 3rd Place | 1506 4th Place | 1507 5th Place |
|---|---|---|---|---|---|---|
| 2 | 1 | 100.00% | | | | |
| | 2 | 70.00% | 30.00% | | | |
| 3 | 1 | 100.00% | | | | |
| | 2 | 70.00% | 30.00% | | | |
| | 3 | 60.00% | 30.00% | 10.00% | | |
| 4 | 1 | 100.00% | | | | |
| | 2 | 70.00% | 30.00% | | | |
| | 3 | 60.00% | 30.00% | 10.00% | | |
| | 4 | 50.00% | 25.00% | 15.00% | 5.00% | |
| 5-29 | 1 | 100.00% | | | | |
| | 2 | 70.00% | 30.00% | | | |
| | 3 | 60.00% | 30.00% | 10.00% | | |
| | 4 | 50.00% | 25.00% | 15.00% | 5.00% | |
| | 5 | 40.00% | 20.00% | 15.00% | 10.00% | 5.00% |
| 30-59 | 1 | 100.00% | | | | |
| | 2 | 70.00% | 30.00% | | | |
| | 3 | 60.00% | 30.00% | 10.00% | | |
| | 4 | 50.00% | 25.00% | 15.00% | 5.00% | |
| | 5 | 40.00% | 20.00% | 15.00% | 10.00% | 5.00% |
| 60-99 | 1 | 100.00% | | | | |
| | 2 | 70.00% | 30.00% | | | |
| | 3 | 60.00% | 30.00% | 10.00% | | |
| | 4 | 50.00% | 25.00% | 15.00% | 5.00% | |
| | 5 | 40.00% | 20.00% | 15.00% | 10.00% | 5.00% |
| 100-139 | 1 | 100.00% | | | | |
| | 2 | 70.00% | 30.00% | | | |
| | 3 | 60.00% | 30.00% | 10.00% | | |
| | 4 | 50.00% | 25.00% | 15.00% | 5.00% | |
| | 5 | 40.00% | 20.00% | 15.00% | 10.00% | 5.00% |

FIG. 15

| Start Date | Spots Available | Game/Mode | # Players | Entrance Fee | 1st | 2nd | 3rd |
|---|---|---|---|---|---|---|---|
| 1/15/18 | 0/25 | TKOH | 10 | $100.00 | $2,500 | NA | NA |
| 7/5/18 | 3/75 | TDM | 12 | $1,000.00 | $72,000 | NA | NA |
| 9/1/18 | 40/100 | TDM | 5 | $500.00 | $30,000 | NA | NA |
| 3/17/18 | 2/24 | CTF | 12 | $2,500.00 | $55,000 | NA | NA |
| 11/12/18 | 10/20 | TBR | 9 | $5,500.00 | $55,000 | NA | NA |
| 10/23/18 | 1/7 | TDM | 4 | $100.00 | $600 | NA | NA |
| 8/25/18 | 10/100 | TDM | 8 | $100.00 | $9,000 | NA | NA |
| 2/17/18 | 8/42 | TDM | 9 | $10,000.00 | $340,000 | NA | NA |
| 2/30/18 | 13/30 | TDM | 10 | $100.00 | $1,700 | NA | NA |
| 4/3/18 | 5/15 | CTF | 7 | $100.00 | $500 | NA | NA |
| 10/19/18 | 4/17 | TDM | 15 | $100.00 | $1300 | NA | NA |

METHODS AND SYSTEMS FOR INTERACTIVE GAMING

CROSS-REFERENCE TO RELATED APPLICATION

This application is a Non-Provisional of U.S. application Ser. No. 62/615,166, filed Jan. 9, 2018, which is herein incorporated by reference.

BACKGROUND

There are hundreds of millions of potential e-sports competitors looking for opportunities to join and play competitive video games. Many of these competitors play competitive video games as a way to make money and more are starting to view it as a viable career choice.

In an attempt to create a league similar to the NFL but geared towards video games, teams of players from select games are being sold through the use of contracts to people such as the Patriots owner, Robert Kraft. These teams, specifically referring to the game Overwatch in this example, are being sold for twenty million (USD), while the players are started at a salary of fifty thousand (USD) a year, plus a percent of what they earn through successful completion of tournaments. These teams encompass a tiny fraction of the market and severely limit who is able to participate in interactive gaming tournaments. The difference between professional sports and video games are the number of people with the skill to compete on a professional level. For reasons such as physical ability and strength coupled with societies growing interest in virtual games, there is an exponentially larger number of people with the skill to compete in professional, interactive gaming tournaments compared to that of professional sports.

In current embodiments, interactive gaming tournaments with entrance fees and cash prizes based on skill rely on an event organizer to collect and distribute the entrance fees and prize pools by visually witnessing the outcome of matches.

In another current embodiment, prize pools are digitally sent through the control of an event organizer based on the screen shots of participants scores submitted to the event organizer or organizer of the interactive gaming tournament in question.

Regarding an increasingly minor stigma associated with video games becoming a profession as well as the vast number of children under the age of 18 with the ability to make a career, or at least generate income, out of interactive gaming tournaments, a method in allowing parents or legal guardians to monitor their children's gains or losses is needed to provide some direction and assurance to the parents in monitoring the progress of these younger gaming competitors.

For these and other reasons, there is a need for the present invention.

SUMMARY

According to an embodiment of a method, the method includes generating, by one or more processors, interactive gaming match content in response to a request inquiry from a user device that is associated with a user. The interactive gaming match content includes at least one gaming match and an entrance fee associated with the at least one gaming match. Content is generated for the customer device that includes the interactive gaming match content. The method includes sending, by the one or more processors, a request for validation to a payment service in response to an entrance request from the customer device. The entrance request includes a selection of one of the at least one gaming matches. The method includes sending, by the one or more processors, population content for the one of the at least one gaming match in response to receiving validation content from the payment service. The validation content includes confirmation that a user account associated with the user contains funds that are equal to or greater than the entrance fee for the one of the at least one gaming match.

Those skilled in the art will recognize additional features and advantages upon reading the following detailed description, and upon viewing the accompanying drawings.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

FIG. 9 illustrates the relationship between the client, payment API, and game server corresponding to an individual's outcome with a monetary value less than or equal to 0 through.

FIG. 14 illustrates an embodiment of a payout structure for a team based virtual or interactive gaming tournament.

FIG. 15 illustrates an embodiment of a payout structure for an individual based virtual or interactive gaming tournament or match.

DETAILED DESCRIPTION

Figure 1:
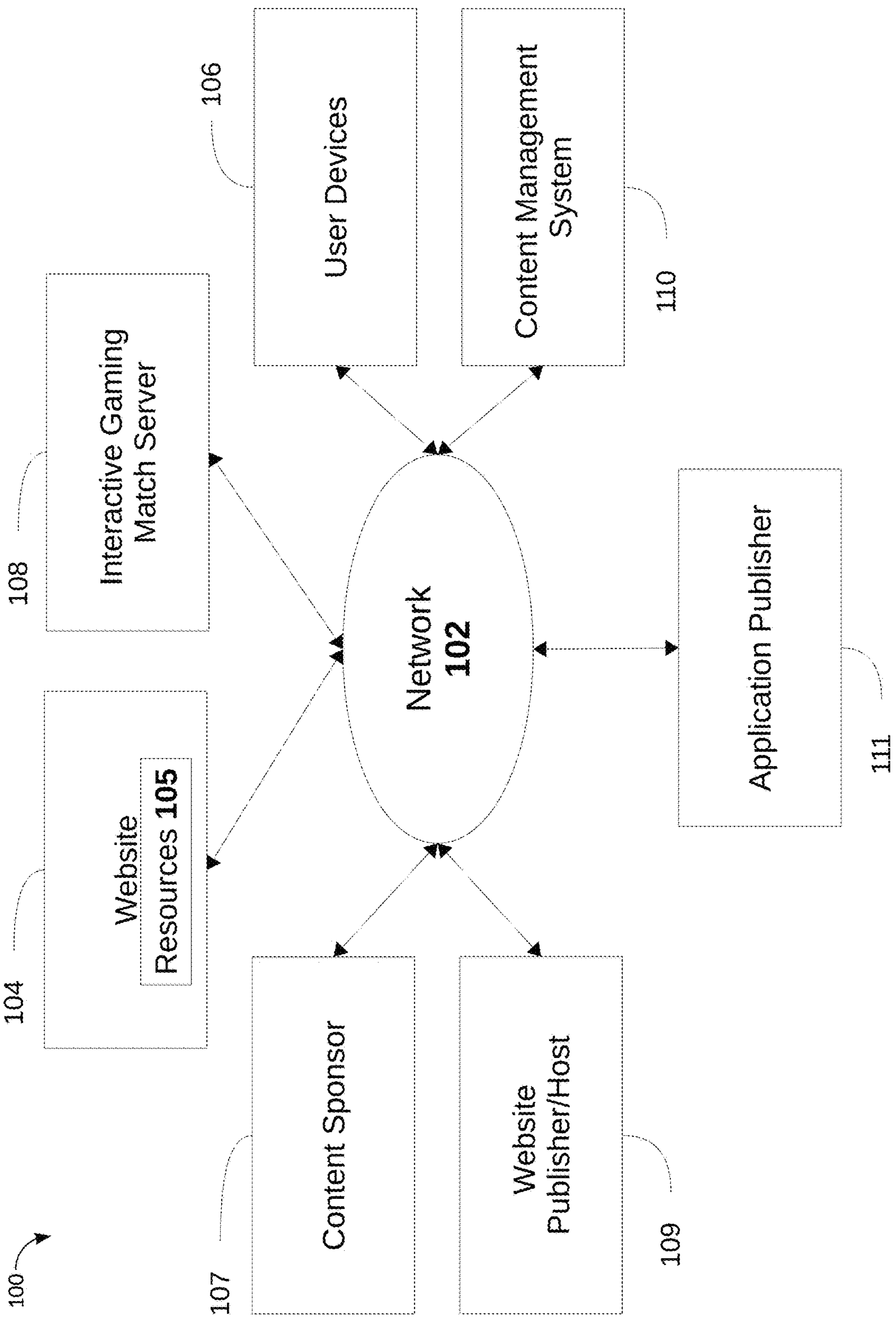
FIG. 1. Illustrates an embodiment of a block diagram of an example environment for providing content to a user device such as a personal computer or interactive gaming console system.

Stage 1 of the launcher described in the embodiments herein, gives the e-sports market an equivalent to professional sports' minor leagues. This digital minor league consists of a revolving door of servers (gaming matches), based on the model of quick-game lobbies, and combined with a small entrance fee such as one would see in a bass fishing tournament. The reward for the players finishing in the top 5 (e.g., out of 10 or 20 players) is directly proportional to how many players are on the server and the entrance fee for each player. The initial entrance fee is purposely small to minimize the risk of a player desiring to move into the more competitive side of the market and allows anyone to participate in the gaming match.

Along with, but not dependent on trying to entice people through streamers, clever marketing or an intricate micro-transaction based economy, stage 1 is able to promote itself through scoreboards. Posting the winnings of the top players in the scoreboard section allows players to see that it is possible for them to join in games and potentially make money in doing so.

Another aspect of the embodiments described herein provide the end users with the means to host and/or participate in their own professional tournaments for profit. On a broader scope, this launcher provides a way to advance the e-sports market by directing the flow of players into 2 different stages. Stage 1 is aimed at giving people who watch streamers, or are casual gamers, and provides easy access to the more competitive world of e-sport gaming competitions. Stage 2 encompasses the more competitive world and includes teams, tournaments, leagues, stats, championships etc. Both stages have their own section in the launcher, allowing casual gamers that have enjoyed or found success in stage 1 to progress into stage 2 when they want to, without having to download another app or find a third-party league online.

Stage 2 of the launcher provides players with the tools to create and manage their own interactive gaming tournaments. In various embodiments, it is the social-media of e-sports. On top of players creating their own teams, a section supplies teams with a set of tools to host tryouts, compare statistics, communicate with other teams/players, and host their own interactive or virtual gaming tournaments encompassing everything from the buy-in (with an equation determining winnings that are proportional to the number of teams that enter a tournament), start date, and the number of places ($1^{st}$, $2^{nd}$, $3^{rd}$, etc.) that will receive payouts.

In various embodiments, stage 2 of the launcher allows teams to become their own managers by providing the tools to do so. Teams can select by voting the team leaders and/or rely on general consensus in how they create virtual or interactive gaming tournaments. The list of tools that can be implemented on the launcher is endless and encompasses everything needed to allow the teams to manage themselves.

Interactive gaming tournaments in the embodiment described herein naturally form tiers. Higher tiered tournaments have higher payouts than lower tiered tournaments. Starting out, less skilled teams or players have less earnings, and in turn, desire to compete in interactive gaming tournaments that have smaller entry fees. As these less-skilled teams get better, their earnings increase and they will be inclined to find or host virtual or interactive gaming tournaments with larger payouts that match their caliber of skill. If teams at a higher skill level participate in lower tier virtual or interactive gaming tournaments, it can be time-consuming and frustrating as the teams having higher skill levels will desire to enter gaming tournaments that provide larger payouts. From those using a Personal Computer (PC) to those who prefer consoles, this concept can be applied in a multitude of ways to accommodate different sections of the market.

FIG. 1 illustrates an embodiment of a block diagram of an example environment 100 for providing content to a user device. The example environment 100 includes a network 102, such as a local area network (LAN), a wide area network (WAN), the internet, a cloud-based platform or a combination thereof. The network 102 connects websites 104, user devices 106, one or more game servers 108, web site publishers 109, a content management system 110, and application publishers 111, which can include front and back-end interactions between launcher 203 and the tournament system 1209 that runs it (see also, FIG. 2 and FIGS. 12-13). The content management system 110 may be used for selecting and providing content in response to requests for content.

A content sponsor 107, which can also be acting as or on behalf of a team, a team manager, or a user in promoting an interactive gaming tournament, can create a content marketing campaign associated with one or more content items using tools provided by the content management system 110. For example, the content management system 110 can provide one or more account management user interfaces for creating and managing content campaigns. The account management user interfaces can be made available to the application publisher 111, for example, either through an online interface provided by the content management system 110 or as an account management software application installed and executed locally on the client's device.

Website 104 includes one or more resources 105 associated with a domain name or plurality of domain names, and hosted by one or more servers. An example website 104 is a collection of web pages formatted in hypertext markup language (HTML) that can contain text, images, multimedia content, links to download an primary ".exe" executable file for installing launcher app 203, and programming elements, such as scripts. The website can be maintained by a content publisher, which is an entity that controls, manages and/or owns the website 104.

Resource 105 can be any data that can be provided over the network 102. A resource 105 can be identified by a resource address that is associated with the resource 105. Resources 105 include, but are not limited to, HTML pages, documents, images, videos, applications, or a news feed source. The resources 105 can include content such as text or images that contain embedded information such as hyperlinks, scripts, or meta-info.

A user device 106 is an electronic device that is under control of a user and has the capability of requesting and receiving resources 105 over the network 102. Example user devices 106 include personal computers, tablet computers, mobile communication devices, televisions, gaming consoles, virtual gaming headsets, and other devices capable of sending and receiving data over the network 102. A user device 106 or 1306-1309, typically includes one or more user applications such as a web browser, to facilitate the sending and receiving of data over the network 102 (see also, FIG. 13). The web browser can interact with various types of web applications, such as a game, messaging, or an email application, to name a few examples.

Figure 2:
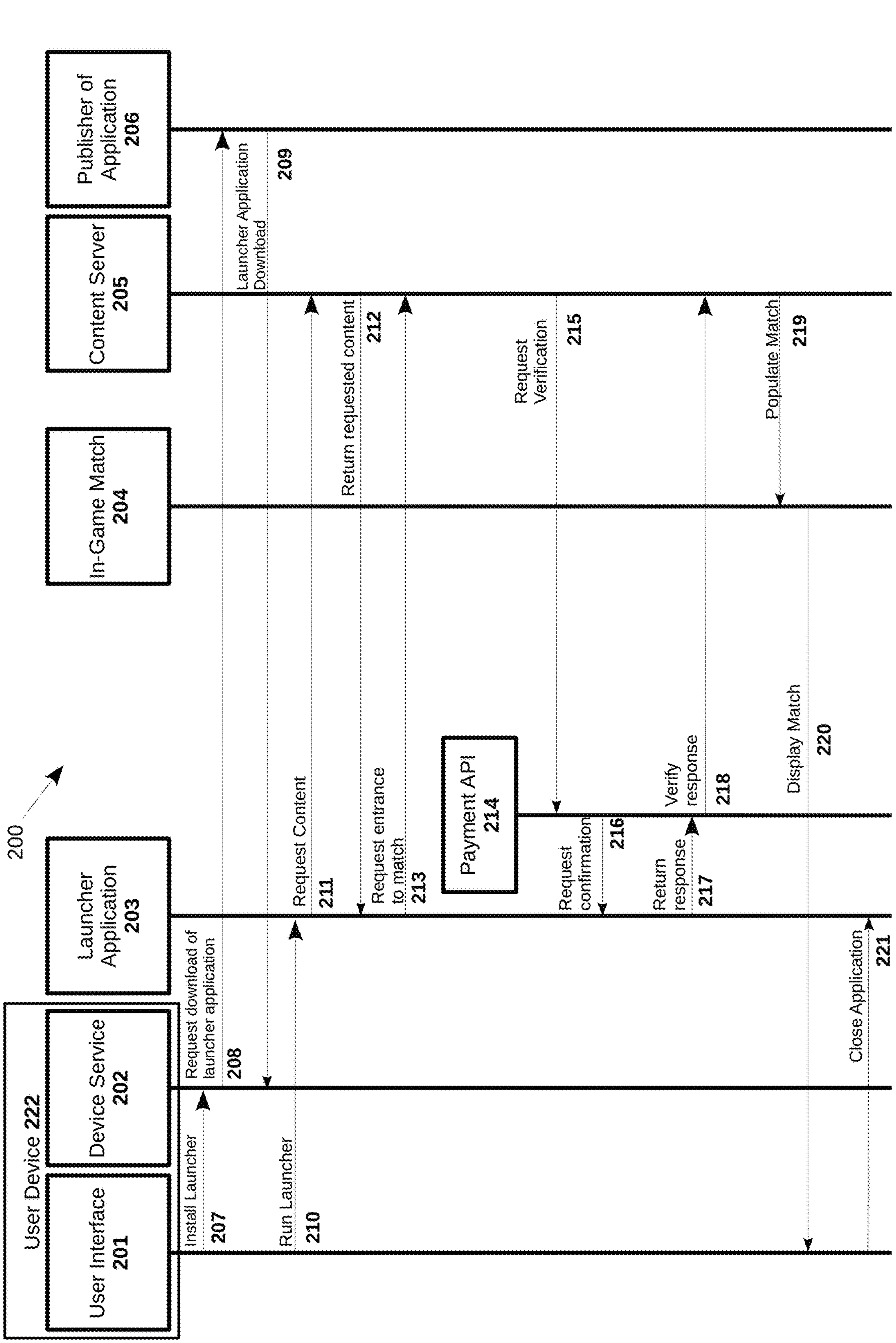
FIG. 2 illustrates an embodiment of a sequence diagram of a process at 200 for interacting with a launcher application in an online environment.

FIG. 2 illustrates an embodiment of a sequence diagram of a process at 200 for interacting with a launcher application 203 in an online environment. Process 200 in various embodiments can be used for stage 1, which assumes the client or player is either not yet part of a team or is part of a team and is deciding to play in an interactive gaming match without dedicated teams. Process 200 in various embodiments can be used for stage 2, which assumes the client is either a team member 1603 or a team manager 1604 (see also, FIG. 16).

In the illustrated embodiment, user device 222 includes a user interface 201 and a device service 202. In various embodiments, user device 222 can be a personal computer, gaming console, laptop or notebook computer. In embodiments where launcher app 203 is not installed on user device 222, a request to download launcher app 203 is initiated at 207 by user interface 201. In the embodiments described herein, launcher app 203 is an application that can be downloaded and run or executed on a user device 222. In other embodiments, launcher app 203 is a cloud-based web application that is hosted, run and executed by the content server 205, and launcher app 203 represents a Graphical User Interface (GUI) where user device 222 can access the launcher app 203 which is hosted on content server 205.

In the embodiments where launcher app 203 is an application that can be downloaded and run or executed on a user device 222, device service 202 may request a download at 208 of installation files for launcher app 203 from the publisher of the application 206 (e.g., in the form of a download link available on a website) over the device service 202, where the download can be performed over the internet or using other suitable forms of data transmission. From the publisher of the application 206, data representing the launcher application 203 is transferred at 209 to the device service 202 where it is installed on user device 222. In various embodiments, the data transferred at 209 can include the base files for the payment API 214.

In embodiments where launcher app 203 is already installed on user device 222, the launcher app 203 can be run or executed via user interface 201. In various embodiments, user interface 201 can include a Graphical User Interface (GUI) which is used to access in-game match 204. Once a user has requested to run launcher app 203 at 210, the launcher app 203 requests content 211 from the content server 205 which can be run by the publisher of the application 206. The content requested at 211 is returned at 212, and is used to populate the application 203 with other clients that have selected the same match to join, acting or referred to as players or participants, and a list of available interactive gaming matches. Requested content 212 can include statistics, match information, player information, as well as other data pertaining to game being played as well as to the people and/or teams playing within the game.

From the list of available interactive gaming matches, a request for entrance 213 is sent to the content server 205 when the user begins the process of joining a match. Once a user has initiated the process of joining a match, a request for verification 215 is sent to the payment API 214 as a means to verify that the account attempting to access the match is legitimate. A request confirmation 216 containing the match information is sent to application 203 and displayed on user interface 201 and serves as an acknowledgment and agreement from the user that they are attempting to join a match. The user's response from the request confirmation 216 is returned 217 to the payment API 214 which is then verified at 218 to have been received by the content server 205. Once the content server 205 has verified the response 218 from the payment API 214 that the users account holds the required funds to participate in the desired match, and also that a predetermined number of participants, or a threshold on the number of participants set by the publisher or host of the virtual or interactive gaming tournament has been reached, the content server 205 populates the match at 219 by sending content to in-game match-204. In-game match 204 displays the match at 220 on the user interface 201. In-game match 204 is the host of the match until the match is finished by the participants that populated the match at 219. In one embodiment, launcher app 203 is used as the interface in which users, or participants, access the interactive gaming matches defined as in-game match 204. In another embodiment, launcher app 203 is defined as a cloud-based web application that is hosted by the content server 205 and that can be accessed by user device 222 to access the interactive gaming matches defined as in-game match 204. In either case, in-game match 204 is the host of the match in which the participants or players or users, are either part of a dedicated team, defined as part of stage 2, or are not part of a team, defined as stage 1. If the user is not acting on behalf or with a team, they can be placed on a temporary team (which lasts the duration of the match), through variables defined in the content server 205 depending on the type of match or game being joined (e.g., team death match or king of the hill). In stage 1, the users profile, which is stored in 1207 and shown as 1208, will not show the user as belonging to a dedicated team if they have been placed on a temporary team, such as when accessing a specific game type such as team death match, and the statistics from the match will be stored in database 1207, and depicted at 1208 (see also, FIG. 12).

Figure 12:
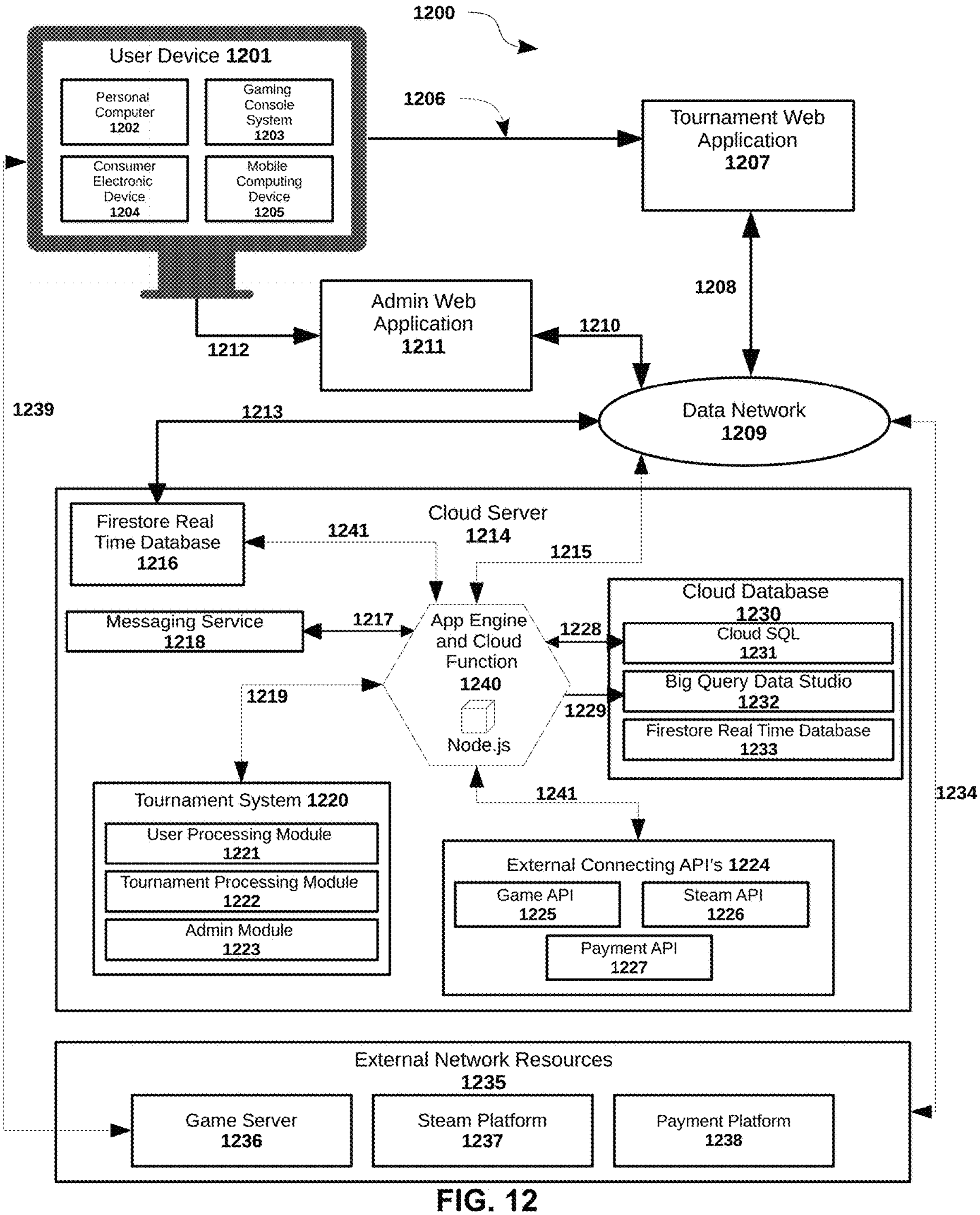
FIG. 12 illustrates embodiments at 1200 of a diagram of network interactions between objects and services used to facilitate the interactive gaming tournament application as illustrated herein.
Figure 17:
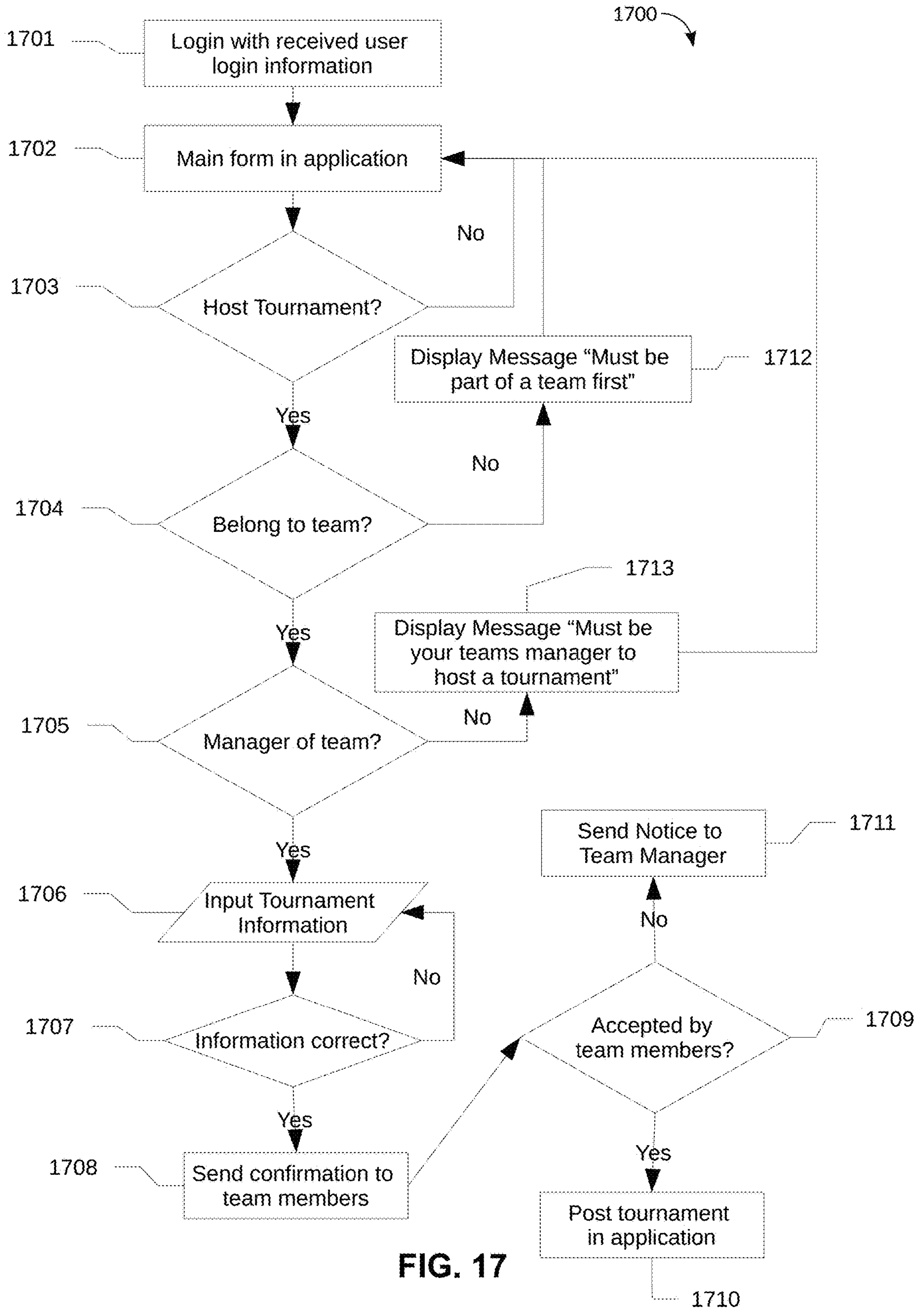
FIG. 17 illustrates an embodiment of a flowchart that illustrates a process for hosting a virtual or interactive gaming tournament by a team or group of users.

If the user is accessing the in-game match 204 as part of stage 2, defined as a tournament created by a team's manager 1604, as shown in FIG. 17, the information including statistics and team status such as team name and rank, is stored in database 1207 and is depicted at 1208 (see also, FIG. 12). In reference to stage 2, in various embodiments, the process depicted in FIG. 2. can be used for joining each match outlined in the bracketed tournament style displayed in FIG. 20. Once the user has finished the match hosted by in-game match 204, the user, via user device 222, can close the application 203, whether hosted by user device 222 or in-game match 204, at 221.

Figure 3:
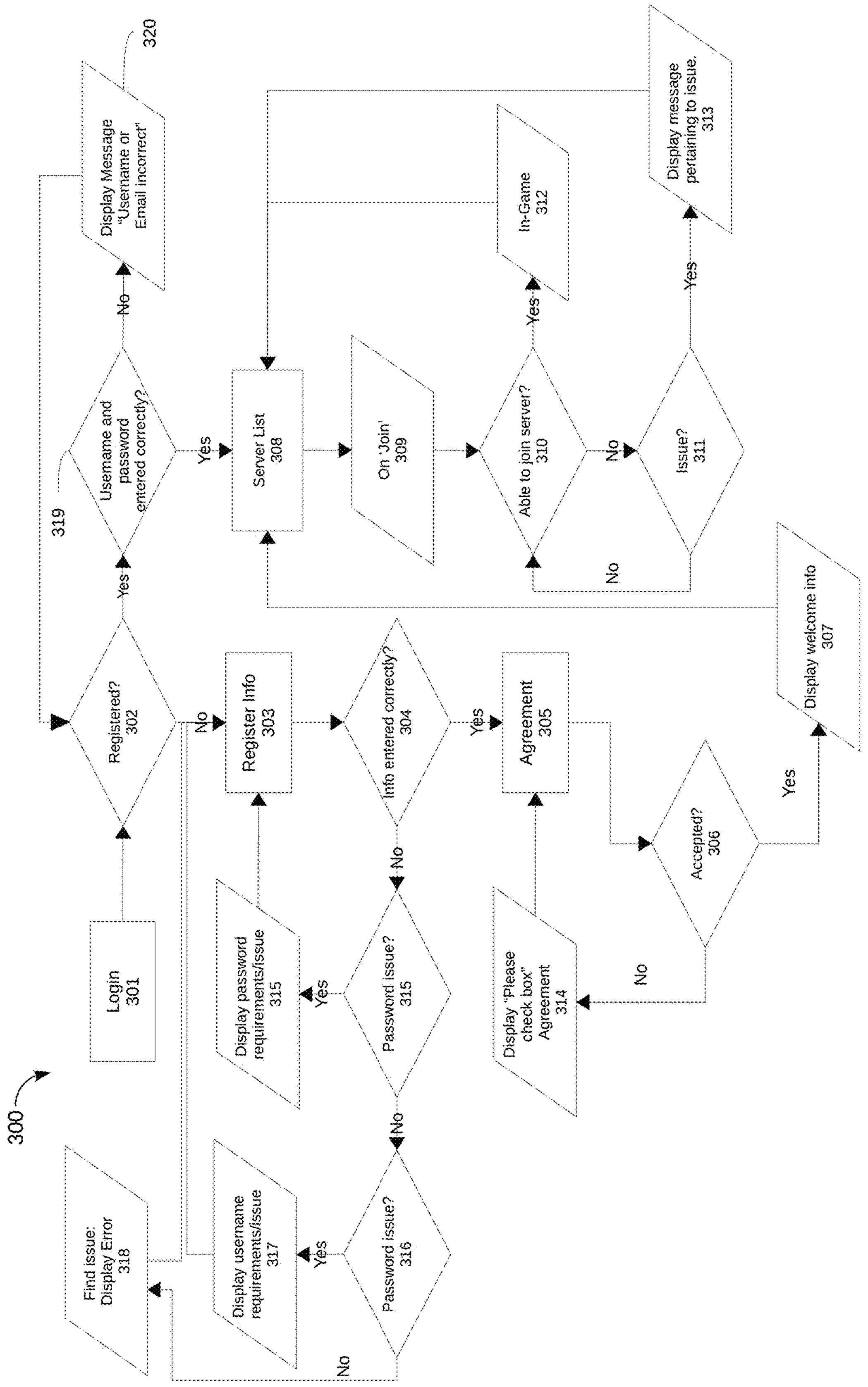
FIG. 3 illustrates an embodiment of player interaction through a flowchart, in joining the application hosted on servers specified in FIG. 1.

FIG. 3 illustrates an embodiment of a flowchart of a player or user interaction through the use of a user device 222, such as a personal computer or gaming console, to join launcher app 203 hosted on servers 108 as illustrated in FIG. 1 and FIG. 2. A network may include, but is not limited to, a WAN, internet, cloud-based server or intranet connection, can be used by the user via the user device 222 to access the launcher app 203.

Figure 4:
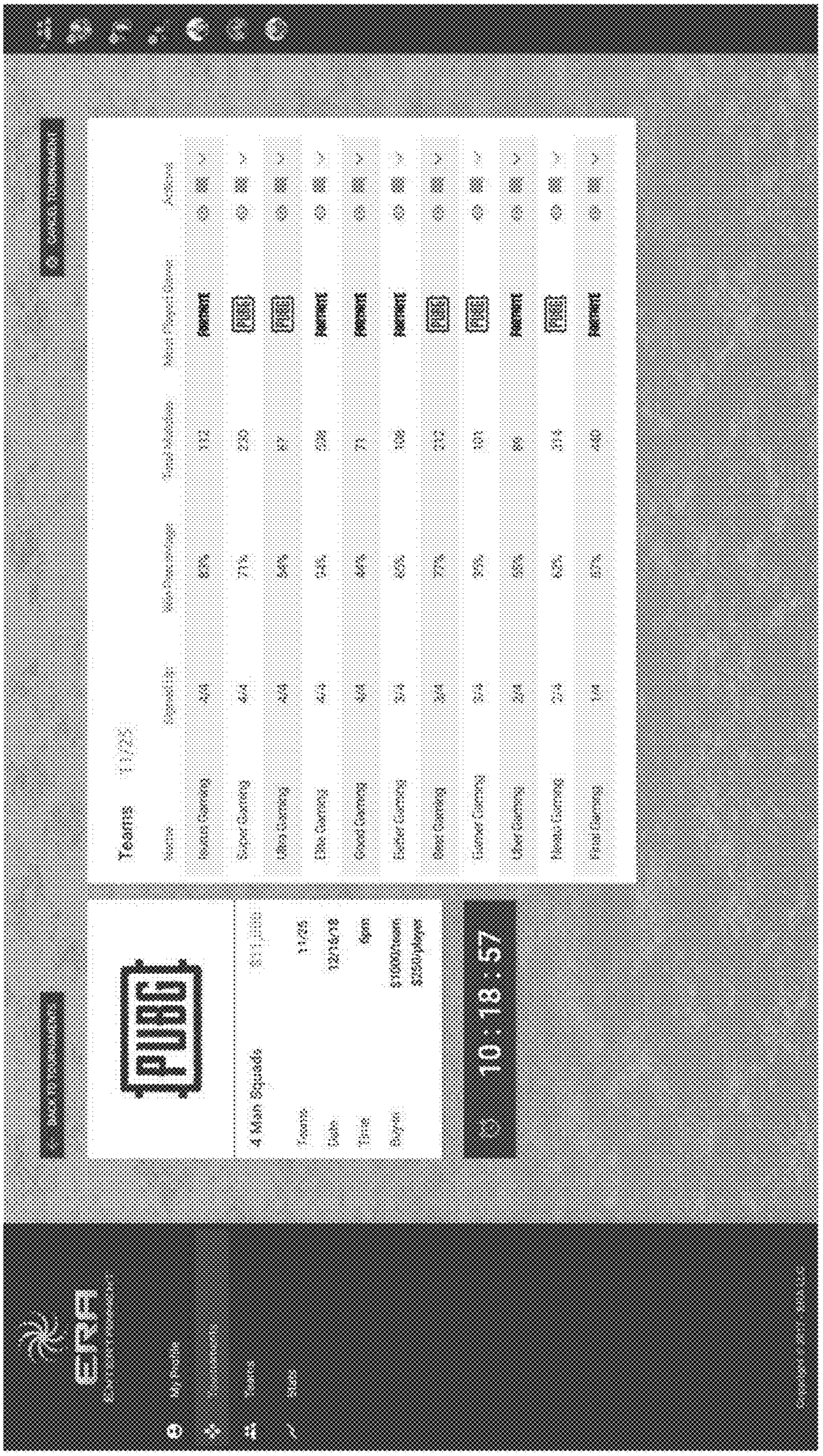
FIG. 4 illustrates an embodiment of a graphical user interface for a user device for content that is generated by a launcher application.

FIG. 4 illustrates an embodiment of a graphical user interface for a user device 222 for content that is generated by launcher application 203. The content displayed includes a scoreboard 400, which is comprised of text conveying a scoring system that results from virtual gaming matches. In the illustrated embodiment, the scoreboard 400 is focused primarily on displaying how much the top players, users, or teams (e.g., groups of users with similar goals), have earned. Developing competitive relationships between players will draw people into looking at the scoreboards more in-depth. Thereby spending more time and energy in the competitive mindset and logged into the actual launcher.

Figure 5:
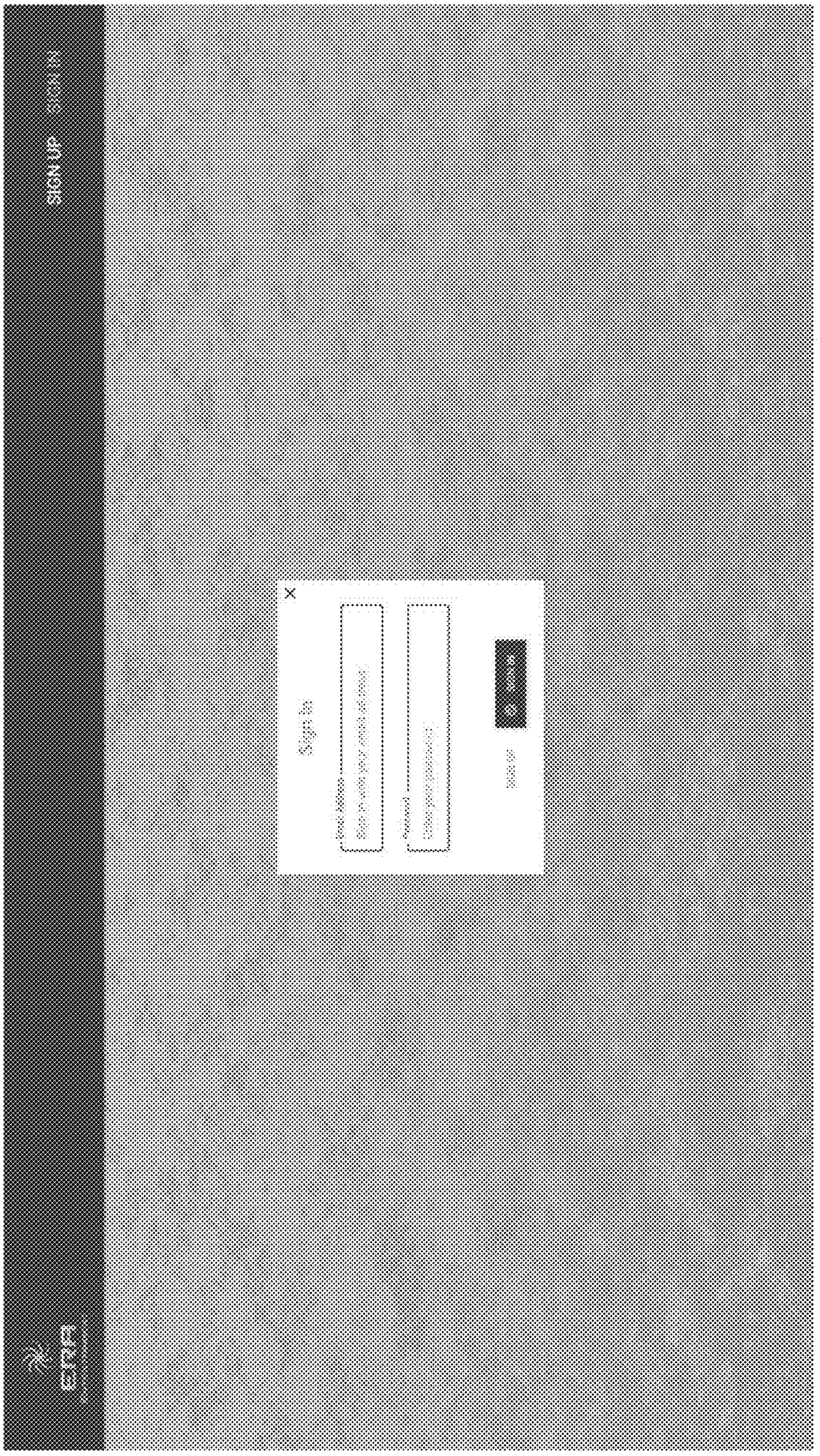
FIG. 5 illustrates an embodiment of a graphical user interface for a user device for content that is generated by a launcher application.

FIG. 5 illustrates an embodiment of a graphical user interface for a user device 222 for content that is generated by launcher application 203 and illustrates a login window at 500. Login window 500 is a form in which a user logs into the launcher app 203 after an account has been created after using the form represented in FIG. 6.

Figure 6:
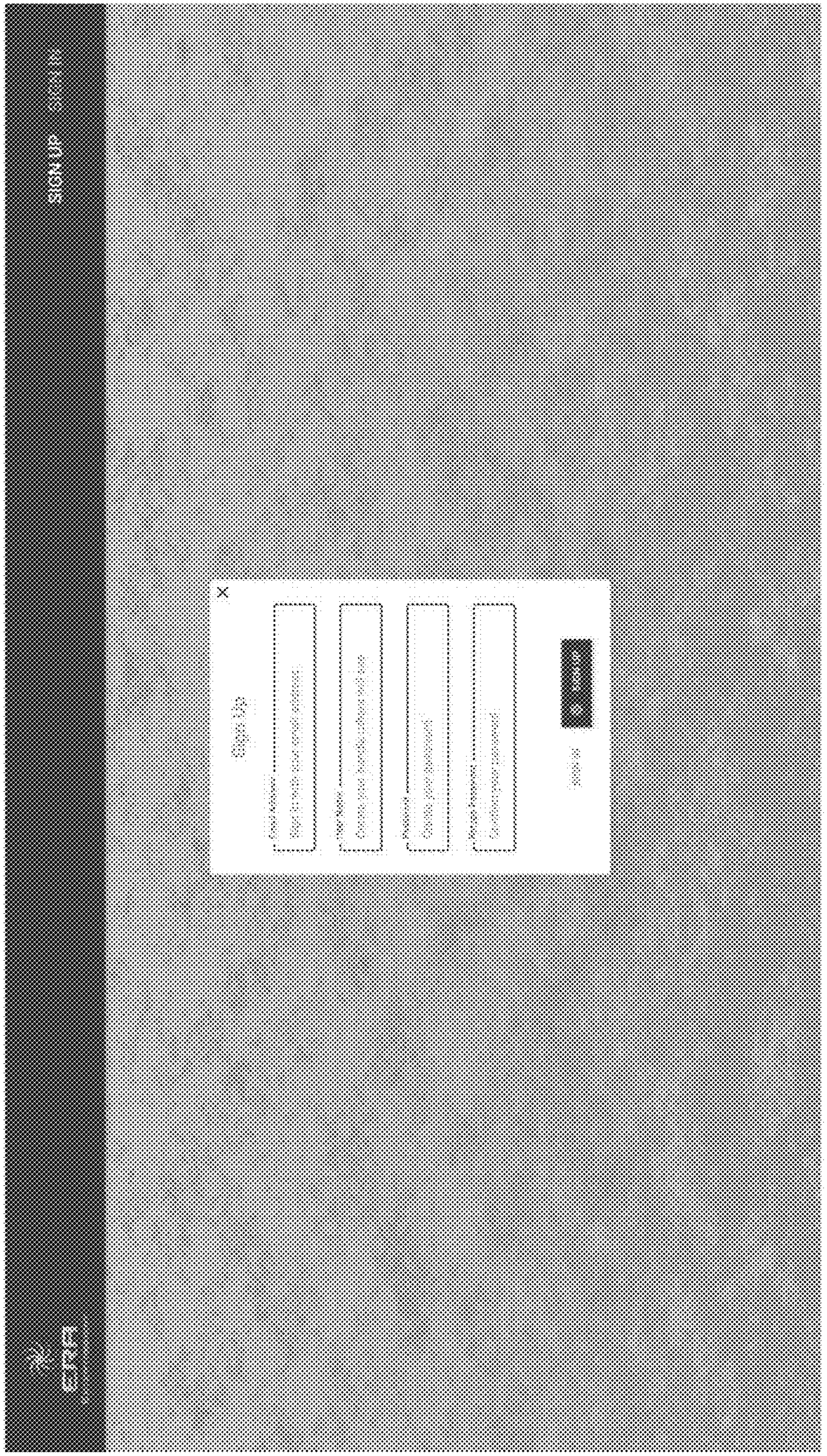
FIG. 6 illustrates an embodiment of a graphical user interface for a user device for content that is generated by a launcher application.

FIG. 6 illustrates an embodiment of a graphical user interface for a user device 222 for content that is generated by launcher application 203 that illustrates information required at 600 to create an account. The account is created and stored in the publisher's database illustrated in the embodiments of FIGS. 12 and 13.

Figure 7:
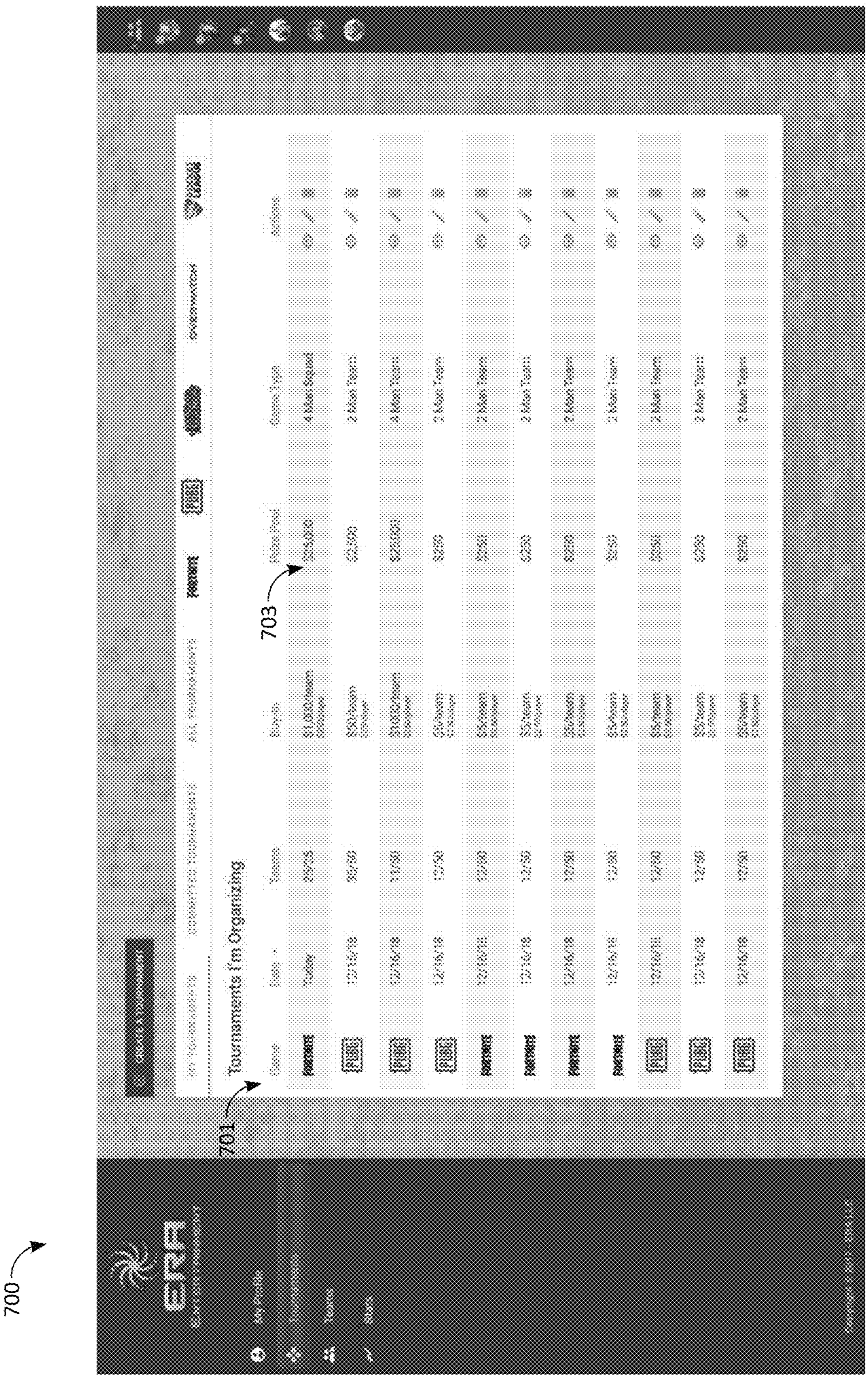
FIG. 7 illustrates an embodiment of a graphical user interface for a user device for content that is generated by launcher application that displays available matches or games for users to join.

FIG. 7 illustrates an embodiment of a graphical user interface for a user device 222 for content that is generated by launcher application 203 that displays available matches or games for users to join at 700. The form at 700 embodies a "casual" or "quick game" section of launcher app 203, referred to as stage 1 throughout. Form 700 provides players or users with the option of joining a virtual gaming match, in which they can select by using the information displayed in text and shapes within form 700, either with or without belonging to a team 1602, and can join an interactive gaming match or virtual or interactive gaming tournament quickly by selecting a server, hosting the interactive gaming match, from the list specified at 702 (see also, FIG. 16). Server information conveying interactive gaming match information through text displayed at 702 includes, but is not limited to, a server identifier such as match name and/or number, entrance fee, server capacity, spots available, proportional winnings, etc. Information displayed at 701 depends on the server selected, or clicked on, by the user, in section 702.

The area represented by 703 displays in text the total payout in monetary or a similar value, based on the total number of players 1303, or users 1201*a* and 1201*b*, or teams 1602, in the lobby at 703, waiting for the interactive gaming match or tournament to begin, multiplied by the entrance fee required to join the server (see also, FIG. 7, FIG. 12, FIG. 13 and FIG. 16).

Figure 8:
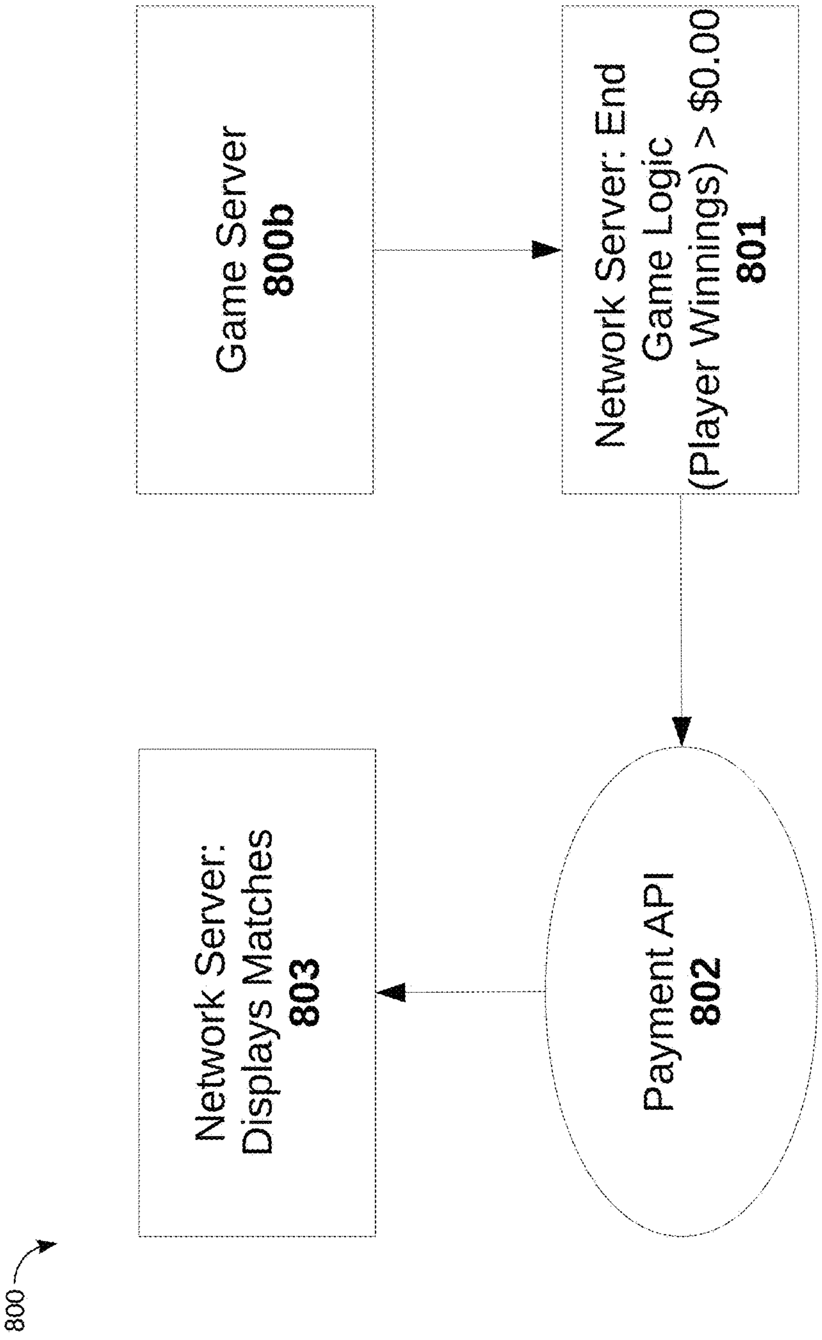
FIG. 8 illustrates an embodiment of a flowchart which shows the relationship between the client, payment API, and game server corresponding to an individual's outcome with a monetary value greater than 0.
Figure 13:
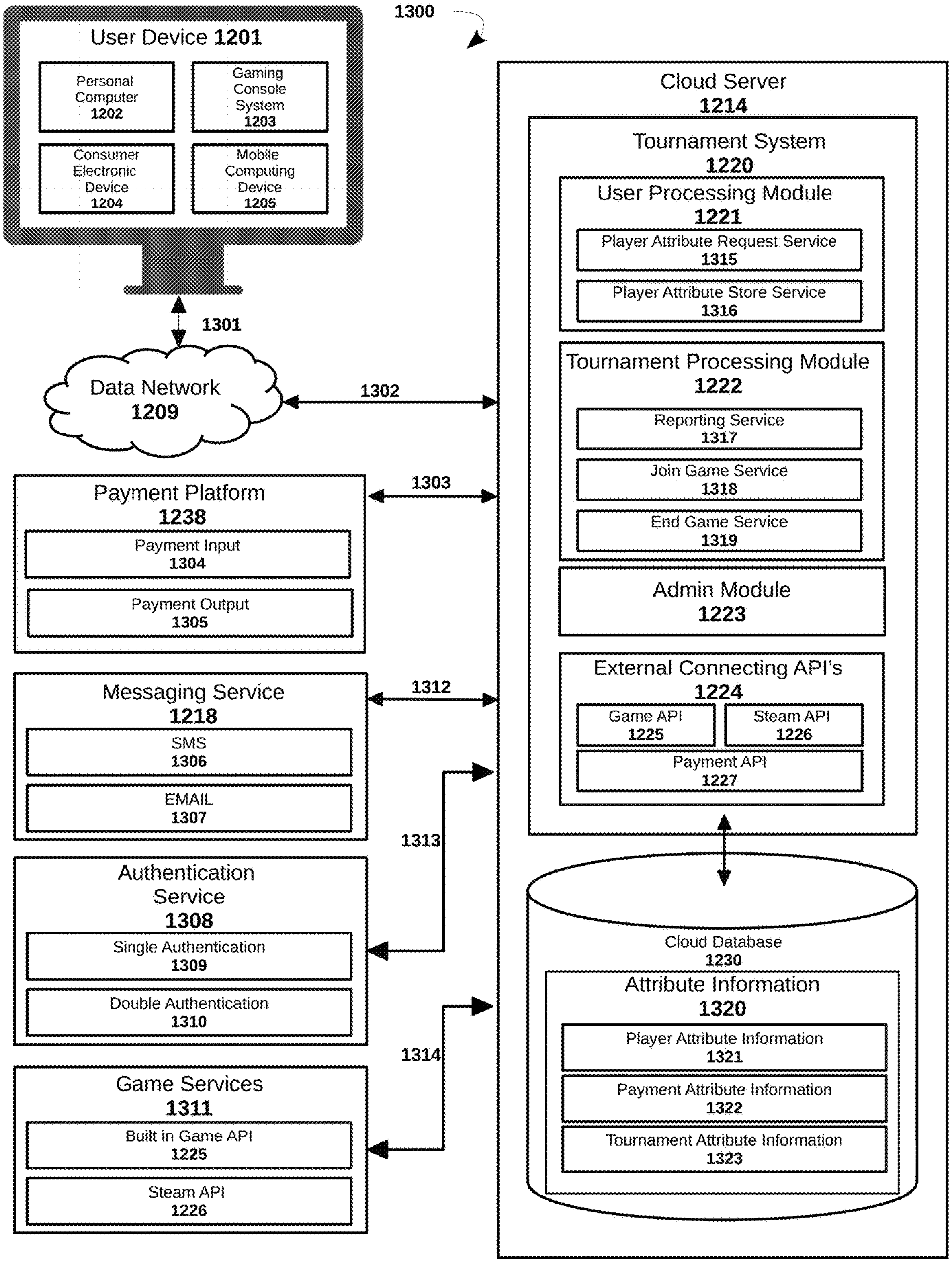
FIG. 13 illustrates an embodiment of virtual or interactive gaming tournament system in a network-enabled environment.

FIG. 8 illustrates an embodiment of a flowchart which shows the relationship between the client or user 1303, the payment API 1204, and a game server, also referred to as content server 205, corresponding to an individual's outcome with a monetary value greater than $0 (see also, FIG. 2, FIG. 12 and FIG. 13). Upon completion of the match on game server 800*b*, the end-game logic 801 determines the payout on a prorated basis for each client, where the payout is determined by the scoring system within the particular game or match, an example of which is shown in FIG. 14 and FIG. 15. End-game logic is defined as the system of weighing and scoring client or player scores based upon the outcome of a match; this can vary based on the type of match being played. An example is a point being awarded for each opponent a player kills in a team death match based game.

If the end-game logic 801 determines that the player's monetary difference is greater than $0, the client is routed through the payment API 802, which adjusts the players account balance by adding the sum of money the player has earned to their account. The payment API may act as a third party application that is pending and interfaced when necessary to send and receive data to and from launcher app 203 described herein, over a network as described in further detail below.

Once the payment API 802 has adjusted the players account balance according to their end of match placement, based on the scoring system dependent on the type of match or game being played, the client is sent back to the server which hosts the form displaying the available matches in launcher app 203.

The payment API 802 can include a method for monitoring the funds linked to the users account through a third party, such as a parent of a user of launcher app 203 as a means to monitor their child's progress in interactive gaming tournaments or matches.

Figure 9:
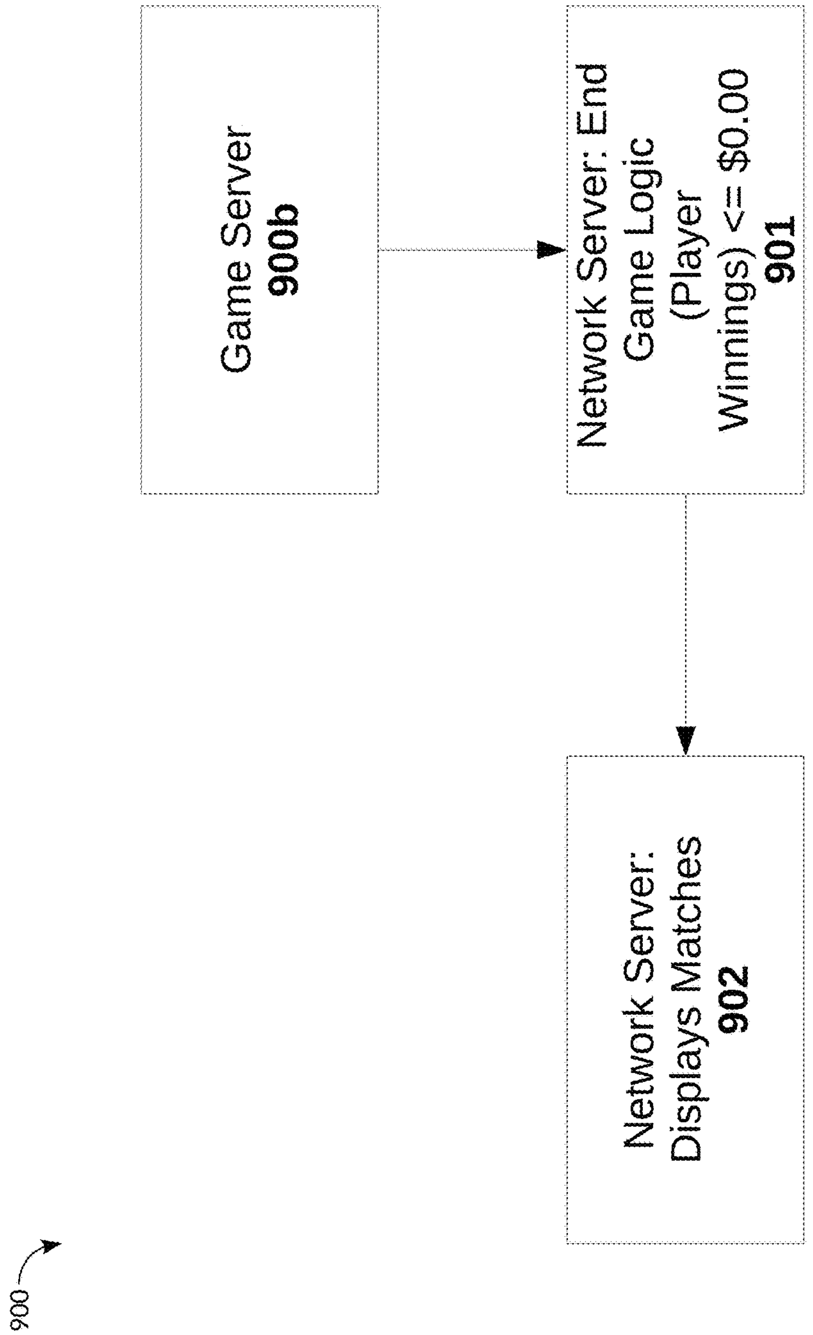

FIG. 9 is an embodiment of a flowchart illustrating the relationship between the client, or user, network server, and game server corresponding to an individual's outcome in an interactive gaming match or tournament, outlined in the format described herein, and with a monetary value that is less than or equal to $0.

Upon completion of the interactive gaming match 900*b*, either as part of a tournament system referred to as stage 2 in which the user belongs to a dedicated team, or stage 1 in which the user is competing on a temporary team, or alternatively a free for all match, the end-game logic 901 determines the payout on a prorated basis for each client determined by the scoring system in the particular game or game mode, set by the publisher of launcher app 203 or user acting as the team manager as described herein. If the end-game logic 901 determines that the player's monetary difference is less than $0, the client is routed back to the network server 902 which displays the list of available matches.

Figure 10:
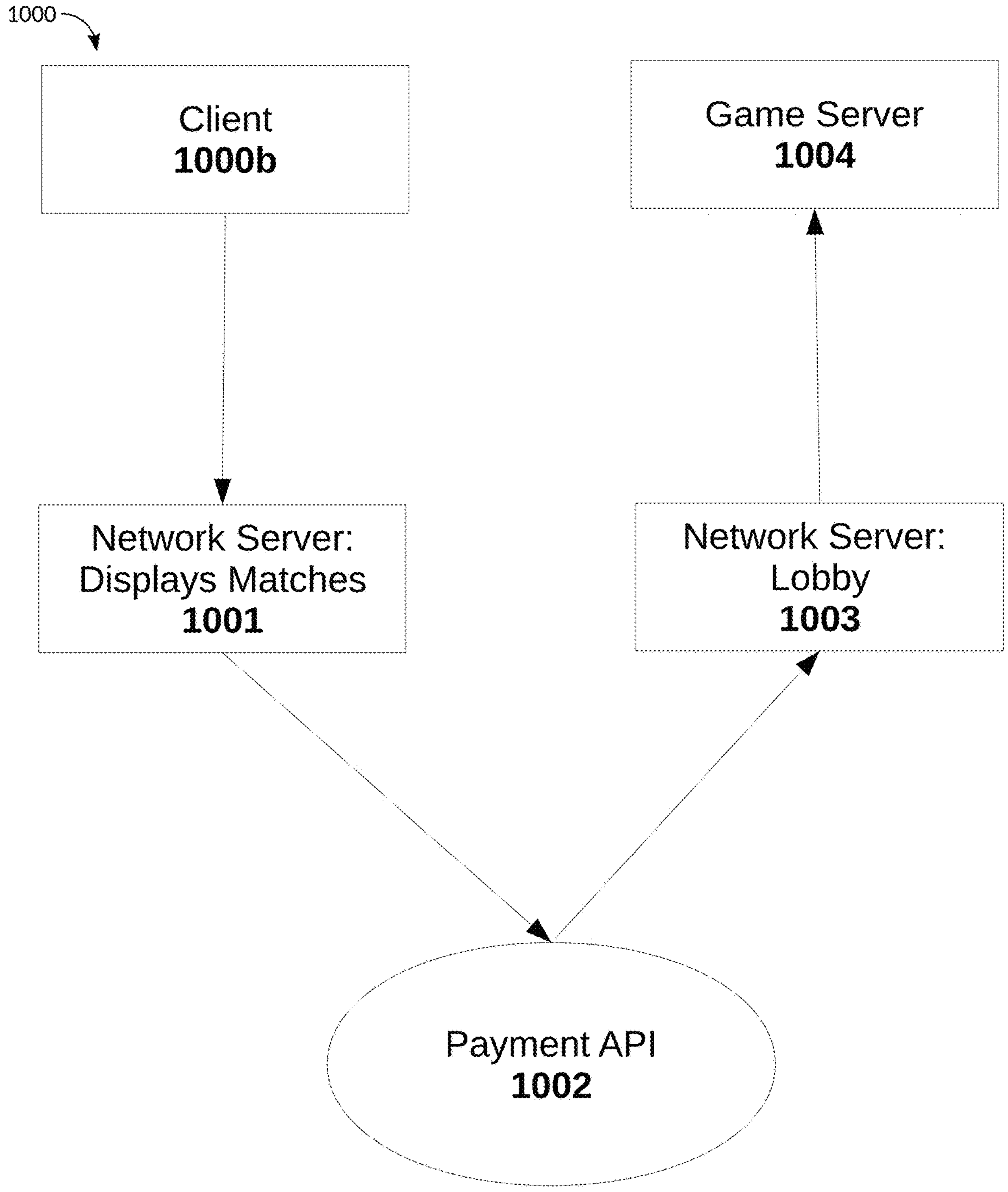
FIG. 10 illustrates an embodiment of a flowchart illustrating the relationship between the client, network server listing the available matches, payment API, network lobby server, and game server in joining a match.

FIG. 10 illustrates an embodiment of a diagram at 1000 for joining a match, which shows the relationship between the client 1000*b*, the network server 1001, payment API 1002, a network lobby server 1003, and a game server 1004 when joining a match. The network server 1001 contains the tournament system 1209, tournament system interface 1206, and databases 1207, and lists the available matches that the player, or user, is able to join.

Network server 1001 displays a list of servers, referred to as interactive gaming matches, that contain information, similar or unique to each other, including but not limited to, the entrance fee (e.g., ranging from $1.00 to $20.00), total client capacity referring to the number of people able to join the aforementioned interactive game server (e.g., ranging from 10 to 200 available positions), represented as the difference between the total client capacity of the selected server minus the number of clients currently registered in the server containing the lobby 1003. The lobby 1003 represents a waiting area or pause while clients weight to be directed to game server 1004 once a gaming match begins.

The client 1000*b* chooses one of the servers from the list of one or more servers, also referred to as a list of interactive gaming matches, displayed at 1001, and proceeds to select the desired server. Once a server has been selected from 1001, the client 1000*b* is redirected through the connection specified as WLAN, WAN, WWAN, MAN, a cloud-based server or system, or PSTN to the payment API 1002, including but not limited to, message formats & protocols, SOAP XML Web Services, HTTP/S POST APIs, REST APIs, and/or SDKs.

The payment API 1002 includes, but is not limited to, message formats & protocols, SOAP XML Web Services, HTTP/S POST APIs, REST APIs, and SDKs, and displays a message at the clients graphical user interface, verifying that the entrance fee will be subtracted from the client 1000*b* account managed by the payment API. The payment API verifies the client 1000*b* account, which may be connected to a banking system through the payment API, or partially managed by it, has a monetary value equal to or greater than the amount selected (entrance fee) before redirecting to the network server 1004 containing the game lobby of the server selected at 1001 by the client 1000*b*.

Once the network server hosting the lobby 1003 reaches the capacity of clients 1000*b* specified in the details provided in the server selection at 1001, the client 1000*b* is directed to the game server 1004 to begin the match.

Figure 11:
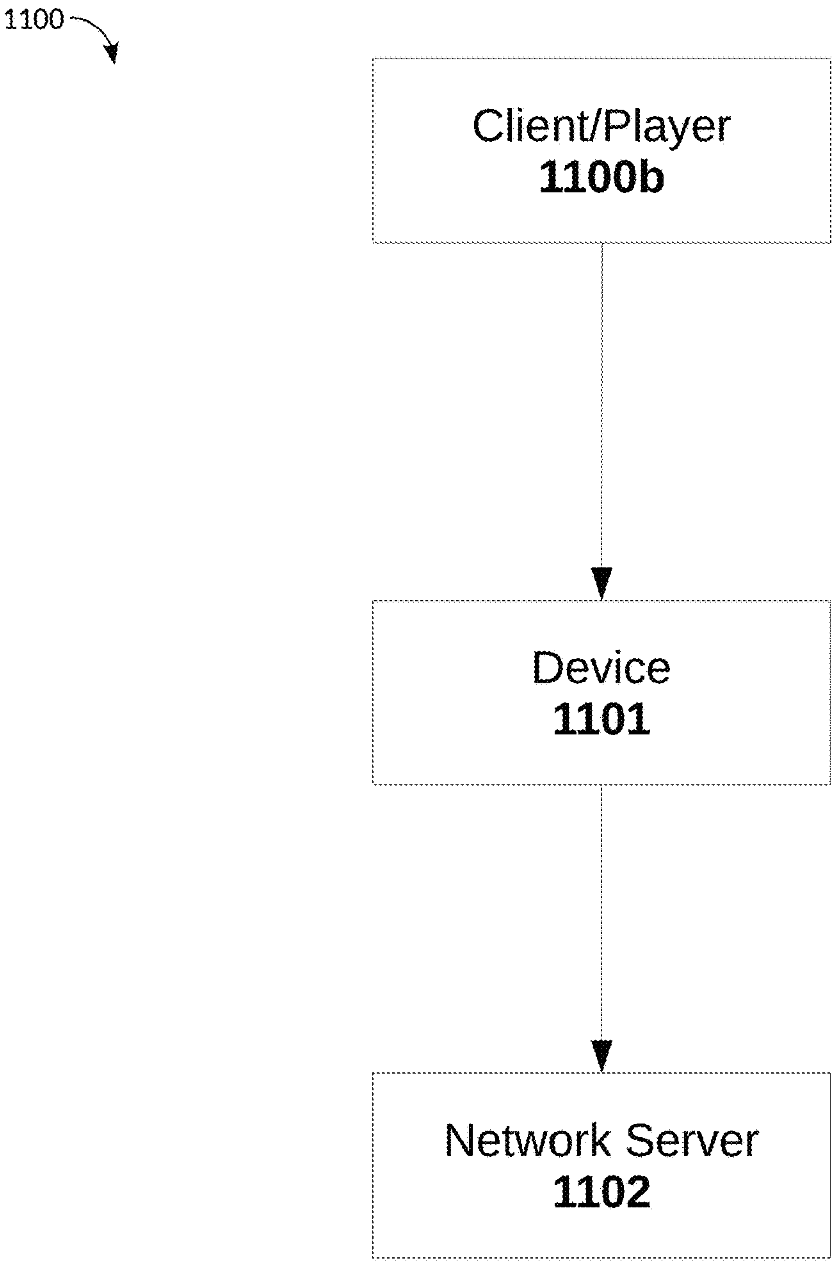
FIG. 11 illustrates an embodiment of a diagram that illustrates the relationship between the player, client device, and network server referred to in FIG. 10.

FIG. 11 is an embodiment of a diagram illustrating the relationship between the player 1100*b*, client device 1101, and network server 1102. The client device is illustrated as device 222 in the embodiment shown in FIG. 2. The player 1000*b* accesses the network system and/or systems through the client device 1101 which refers to a personal computer, virtual gaming device, and/or gaming console, or a similar device mentioned herein. Utilizing the client-side device 1101, the player, or user, connects to the network server 1001 as described in FIG. 10 as 1001, 1003, and 1004, using a connection that includes, but is not limited to WLAN, WAN, WWAN, MAN, a cloud-based server or system, and/or PSTN or similar connection as mentioned herein.

FIG. 12 in embodiment 1200 displays a diagram of interactions between objects and services used to facilitate the interactive gaming tournament application described herein.

The user device 1201 accessing the ERA tournament web application 1207 can be defined as a personal computer 1202, gaming console system 1203 with a primary function of running video games, such as the Microsoft Xbox or Sony PlayStation, other consumer electronic device 1204 that provides access to video games and video game services including but not limited to virtual reality goggles and related hardware, and mobile computing devices defined as mobile phones with built in processing units that can access and run games such as Player Unknown's Battlegrounds and Fortnite.

The selected user device 1201 accesses the ERA Tournament Web Application 1207 at 1206. The ERA Tournament application is referring to the embodiment that is displayed on the graphical user interface to the user device 1201.

The ERA Tournament Web Application 1207 is shown as how it is displayed on the graphical user interface of the user's device in FIGS. 4-7.

The ERA Tournament Web Application 1207 sends and receives data at 1208 as bits over a data network 1209 facilitating the transfer of data as bits using a system of fiber optics cables, radio frequencies, WiFi, or similar delivery method.

A user device 1201 is able to access a second web application at 1212 referred to as Admin Web Application 1211.

Admin Web Application 1211 is accessed by the publisher or administrator of the application to control internal functions such as monitoring player attribute information 1322.

Admin Web Application 1211 sends and receives data at 1210 as bits over a data network 1209 facilitating the transfer of data as bits using a system of fiber optics cables, radio frequencies, WiFi, or similar delivery method.

Parts of FIG. 12 described herein take place on the Cloud Server 1214, referring to the Google Cloud service in one embodiment but may also take place on other similar services such as Amazon Web Services and the like.

Firestore 1216 is a NoSQL real time cloud database able to send and receive data as bits at 1213 over a data network 1209 described above.

The Firestore real time database 1216 sends and receives real time data to the app engine 1240 built in a node.js environment.

Real time data is defined as data that is delivered or sent to the user 1201 instantly and not typically stored as historical data.

Attribute Information 1331 in one embodiment is included in the definition of real time data and is sent and received to the Firestore database 1216.

Messaging Service 1218 is a process taking place within the cloud server for sending a message with the intent to inform or verify a user of changes in player attribute information 1322, payment attribute information 1323, tournament attribute information 1334, or other data stored as attribute information 1321.

Figure 21:
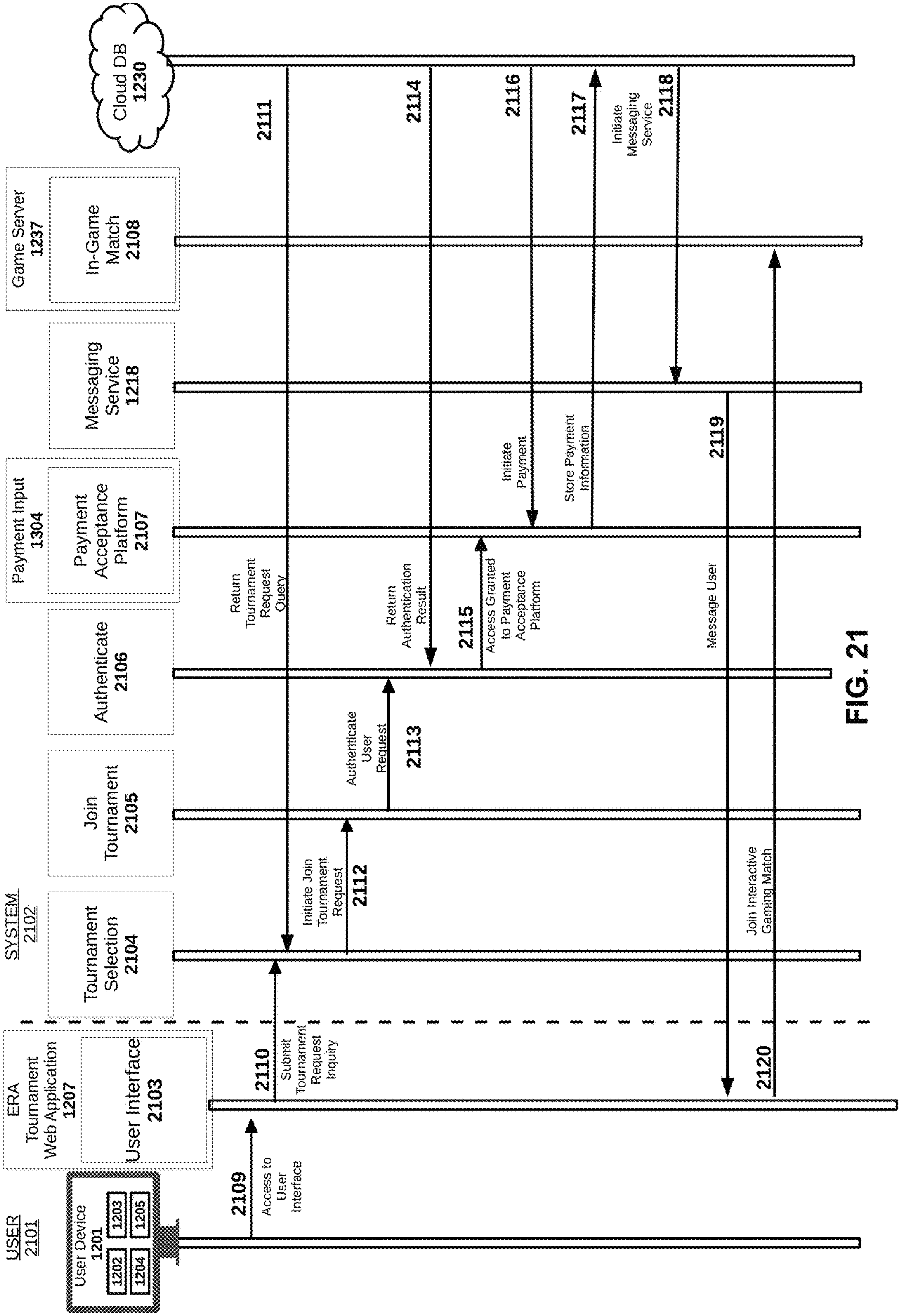
FIG. 21 illustrates a sequence diagram of a process for accepting payments in the platform described herein
Figure 22:
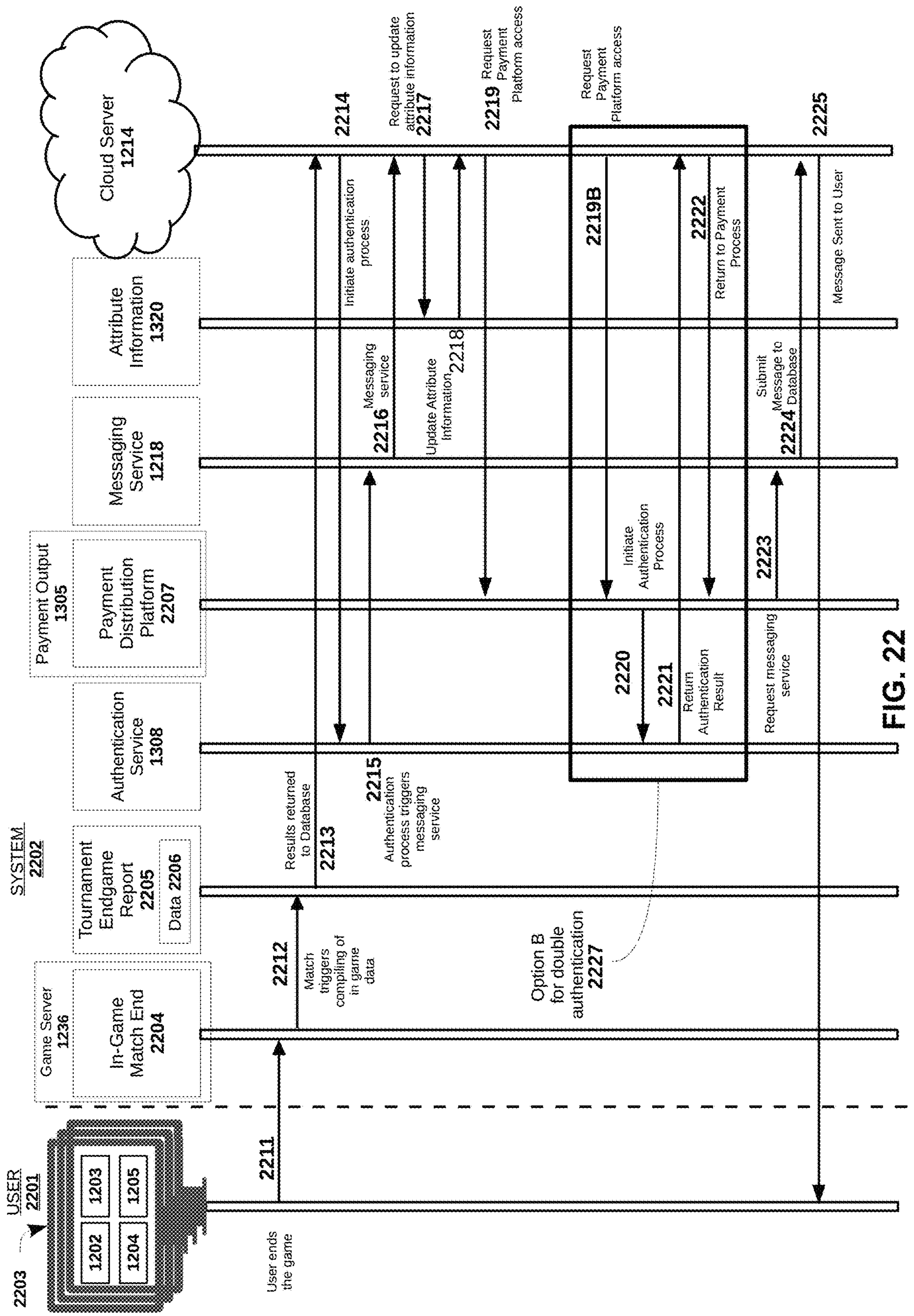
FIG. 22 illustrates an embodiment of a process in which a user as defined throughout exits an interactive gaming tournament or match.

Messaging Service 1218 is referred to in other embodiment's such as FIG. 21 and FIG. 22.

The message sent by the messaging service 1218 can be in the form of a text message, sms, email message, phone call, and is auto generated by a script running in the Node.js environment 1240 based on attribute information 1331.

The tournament system 1220 consists of a User Processing Module 1221, Tournament Processing Module 1222, and Admin Module 1223, all running in a node.js environment hosted on the cloud server described above.

The User Processing Module 1221 facilitates functions and data referred to at 1322 as Player Attribute Information, corresponding to the user associated with the account logged into the ERA Tournament Web Application 1207.

The User Processing Module 1221 exists in a Node.js environment 1240 on the cloud server 1214 described herein and sends and receives data at 1219.

The Tournament Processing Module 1222 facilitates functions and data referred to at 1324 as Tournament Attribute Information, corresponding to the user associated with the account logged into the ERA Tournament Web Application 1207 and the tournaments associated with said user. The tournaments associated with said user are defined as tournaments that the user has selected as shown in process 2104 and 2105 in FIG. 21.

The Tournament Processing Module 1222 exists in a Node.js environment 1240 on the cloud server 1214 described herein and sends and receives data at 1219.

The Administrative Module 1223 facilitates functions and data referred to at 1322 as Player Attribute Information, 1323 as Payment Attribute Information, and 1324 as Tournament Attribute Information, corresponding to the user associated with the account logged into the ERA Tournament Web Application 1207.

The Administrative Module is most commonly accessed through Admin Web Application 1211.

The Administrative Module 1223 exists in a Node.js environment 1240 on the cloud server 1214 described herein and sends and receives data at 1219.

The External Connecting API's 1224 existing on the cloud server 1214 and connected at 1223 in a Node.js environment 1240, include a Game API 1225, Steam API 1226, and Payment API 1227.

The External Connecting API's 1224 all assist in the retrieval or storage of data from the Firestore real time database 1216 or other database listed under Cloud Database at 1230.

The External Connecting API's, in one embodiment, provide extra access to data not typically provided by the services they are connected to.

Game API 1225 provides access to in-game data which is shown utilized in FIG. 22 at 2205 and FIG. 2 at 204.

In-Game data can most commonly be described under attribute information 1321 as including Player Attribute Information 1322 and Tournament Attribute Information 1324.

Steam API 1226 provides access to data used throughout and consisting of Player Attribute Information 1322, Payment Attribute Information 1323, and Tournament Attribute Information 1324, all shown in FIG. 23.

Steam API 1226 fetches and sends data to and from the Steam Gaming Platform 1237 over the data network 1209 described herein and shown at 1234.

Payment API 1227 is involved in the process in FIG. 21 at 2115 and FIG. 22 at 2217.

Payment API 1227 most commonly interacts with Payment Platform 1238 at 1234 over a data network 1209 described herein.

Cloud Database at 1230 consists of a multitude of database styles, relational, object-oriented, and non-relational databases among others, hosted on the cloud server at 1214 described herein as Cloud SQL 1231, Big Query Data Studio 1232, and Firestore Real Time Database 1233.

The Cloud Databases, in this embodiment, are connected to the app engine in a node.js environment 1240 at 1228, 1229, and 1241.

The Cloud Databases are used to store Attribute Information shown in FIG. 13 at 1321.

Cloud SQL 1231 sends, stores, and retrieves transactional data consisting of financial data sent and received through the Payment API 1227. Financial data can include Payment Attribute Information 1323, prize pool winnings as outlined in FIG. 14 and FIG. 15, and is collected in one embodiment shown in FIG. 21 at 2117.

Big Query Data Studio 1232 in this embodiment is sent historical data at 1229 that includes all attribute information outlined at 1321.

Historical data is described as data stored for extended periods of time and is only accessed through the Administrative Module 1223 through the Admin Web Application 1211.

Historical Data is most commonly retrieved when being assessed by the administrative module 1223 for suspicious accounts tied to the user in question.

Firestore Real Time Database 1233 is described as 1216 but depicted under another embodiment show as Cloud Database 1230.

External Network Resources 1235 are defined as platforms, services, or operations interacting with the ERA Tournament Web App 1207 through a Data Network 1209 described herein, but residing outside of Cloud Server 1214 in this embodiment.

Figure 20:
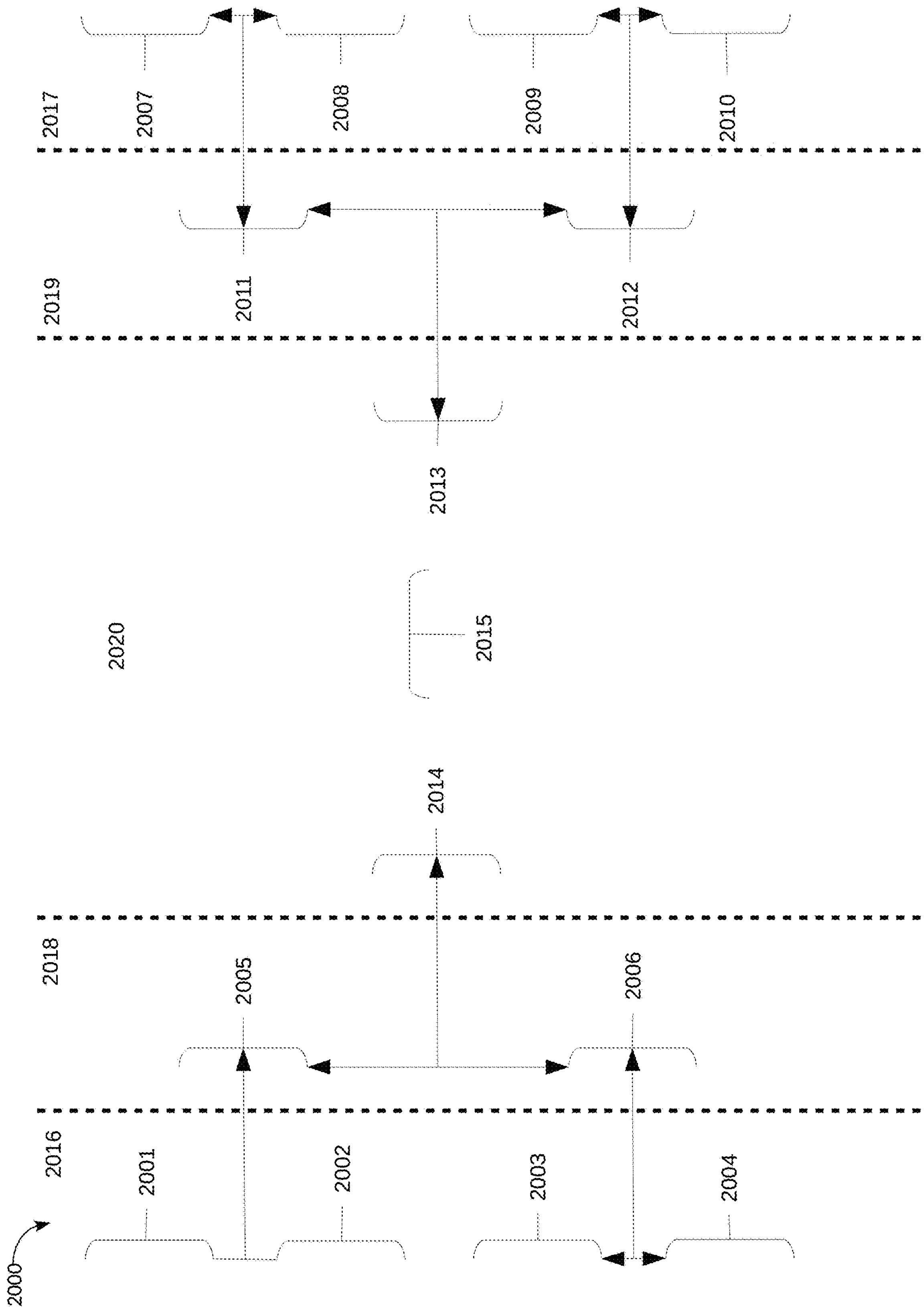
FIG. 20 illustrates an embodiment of a display from a graphical user interface display that illustrates a layout of a bracket for virtual or interactive gaming tournaments.

Game Server 1236 refers to the Publisher of the game the bracket style tournament as outlined in FIG. 20 is occurring on.

In one embodiment, the Game Server 1236 is a server run by the publisher of a game such as Fortnite or Player Unknown's Battlegrounds.

The Game Server is referred to in FIG. 2 as Content Server 205.

Steam Platform 1237 refers to the game library and community platform by the Valve Corporation the user downloads from the steam.exe file supplied by Valve Corporation.

Steam Platform 1237 most commonly interacts with the Steam API 1226 through data network 1209 in this embodiment. Data received from the Steam Platform can be stored as Player Attribute Information 1321.

In one Embodiment, Payment Platform 1238 refers to payment platforms existing outside of the Cloud Server at 1214 described herein.

In one embodiment shown in FIG. 2, Payment Platform 1238 interacts with Payment API 204 in determining and facilitating a tournament entrance fee being paid by the user of the ERA Tournament Web Application 1207.

In another embodiment, Payment Platform 1238 is shown as Payment Acceptance Platform 2107 in FIG. 21.

In one more embodiment, Payment Platform 1238 is shown as Payment Distribution Platform 2207 in FIG. 22.

Payment Platform 1238 exists in one embodiment as a multitude of platforms such as Bluefin, PayPal, Ingo, Stripe, or any combination thereof.

FIG. 13 in embodiment 1300 displays another representation of a diagram of interactions between objects and services used to facilitate the interactive gaming tournament application described herein.

User device 1201 as defined in FIG. 12 is shown in FIG. 13 and consists of a Personal Computer 1202, Gaming Console System 1203, Consumer Electronic Device 1204, and Mobile Computing Device 1205, all defined in FIG. 12 under their corresponding numbers.

The User Device 1201 accesses the Cloud Server at 1302 through a series of fiber optic cables, radio frequencies, WiFi, or similar delivery method shown as Data Network 1209.

Payment Platform 1238 described in FIG. 12 consists of multiple functions described as Payment Input 1304 and Payment Output 1305.

Payment Input 1304 is defined as the process in which a series of interconnected Payment API's described in FIG. 12 at 1227 are connected to the App Engine 1240 with the intent of securely through different authentication methods described in FIG. 22 at 2227 and FIG. 13 at 1309, initiate and carry out the transfer of money from the bank account, PayPal account, digital wallet, or similar system, of the user to the account serving as the holding account for the publisher of the application.

Payment Input 1304 is associated with the tournament entrance fee the user agrees to paying as shown in process 2113 when the user, through the use of User Device 1201, accesses the Join Tournament 2106 feature through the manipulation of pixels on the User Interface 2104 of the ERA Tournament Application 1207.

In one embodiment, Payment Input 1304 refers to the third party platform BlueFin and is accessed through an External Connecting API 1224 such as the Payment API 1227, connected to the App Engine 1240.

In FIG. 21, Payment Acceptance Platform 2108 falls into the category of Payment Input 1304 showing the process the User 2101 goes through in signing up for an interacting gaming tournament or match as described throughout.

Payment Output 1305 refers to the series of functions, systems, and procedures described throughout utilized in the transfer of prize pool money from the prize pool to the winner or multitude of winners associated with a specific bracket style tournament as outlined in FIG. 20.

The prize pool money being facilitated through Payment Output 1305 is determined based on the graphs and calculations outlined in FIG. 14 and FIG. 15.

Payment Output 1305 utilizes Payment API 1227 under the External Connecting API's section 1224 shown in FIG. 12

In FIG. 22, Payment Output 1305 includes the process showing to contain the Payment Distribution Platform 2207.

In one embodiment, Payment Output 1305 contains the third party service named PayPal. In the embodiment containing PayPal as a system within Payment Output 1305, PayPal is accessed through External Connecting API's 1224 at 1223 in FIG. 12.

In FIG. 12, External Network Resources 1235 can refer to PayPal as Payment Platform 1238.

Both aspects of Payment Platform 1238, referring to Payment Input 1304 and Payment Output 1305 send, receive, and store transactional data defined as Attribute Information 1230.

The transactional data associated with the Payment Input 1304 or Payment Output 1305 process is stored on a Cloud SQL Database 1231 and shown to interact with the App Engine 1240 at 1228.

Messaging Service shown in FIG. 13 at 1217 is comprised of a multitude of services, most commonly containing an SMS 1306 or an Email 1307.

SMS 1306 is referring to a delivery method in transmitting messages over a data network such as the one shown at 1209 throughout.

SMS 1306 stands for short messaging service and is commonly referred to as a text message.

SMS 1306 is one of the delivery methods in FIG. 21 sent from Messaging Service 1218 and shown at 2120.

SMS 1306 can be included in the process outlined in FIG. 22 at 2227 referred to as Option B for double authentication.

An SMS 1306 can be part of the system referred to as Authentication Service 1308 as a delivery device in verifying a users identity and integrity, primarily to make sure the user is an actual human and not a script or AI trying to mimic human behavior.

Email 1307 is referring to a delivery method in transmitting messages over a data network such as the one shown at 1209 throughout.

Email 1307 most commonly refers to a delivery method containing a message sent over a data network such as the one shown at 1209.

Email 1307 serves a similar purpose to that of SMS 1306 in that it can be used to verify a users identity or integrity of their account.

Authentication Service 1308 is shown to be connected to the Cloud Server 1214 at 1313 over a data network such as the one shown at 1209 throughout.

Authentication Service 1308 is a series of services and systems used to verify the integrity of a users account defined as containing accurate and real information tied to the person acting as the user.

Authentication Service 1308 is shown in FIG. 22 as the component of the process used to verify a users identity based on Attribute Information 1320 most commonly referred to as Player Attribute Information 1321, Payment Attribute Information 1322, and Tournament Attribute Information 1323.

Single Authentication 1309 is a service operating under Authentication Service 1308.

Single Authentication 1309 is the form of authentication utilized in one embodiment displayed in FIG. 21 from 2114 to 2116.

Single Authentication 1309 is shown as one option in FIG. 22 if 2227 is not implemented in the process.

Double Authentication 1310 in one embodiment refers to the integrity of the user being checked multiple times or through multiple methods specifically outlined in the process of FIG. 22 starting at 2219B through 2222.

Game Services 1311 is comprised of Built in Game API 1225 and Steam API 1226.

Game Services is shown to interact with the Cloud Server 1214 at 1314 over a Data Network such as 1209.

Player Attribute Request Service 1315 is a service comprising part of the user processing module 1221, which is one component to Tournament System referenced at 1220 throughout.

Player Attribute Request Service 1315 is used to request Player Attribute Information 1321, stored in Cloud Database 1230.

Player Attribute Request Service 1315, in one embodiment, can be initiated as part of 2114 shown in FIG. 21 where the Player Attribute Request Service 1315 is initiated at 2107 and Player Attribute Information 1321 is returned from Cloud Server 1214 to continue the process at 2116.

Payment Attribute Information 1322 is shown to be a set of data stored in Cloud Database 1230 related to financial transactions associated with buying into a tournament as outlined in FIG. 21 as well as financial transactions as outlined in FIG. 22 showing the process for a prize pool being disbursed to the winner of the tournament based on calculations relating to those shown in FIG. 14 and FIG. 15.

Payment Attribute Information 1322 in one embodiment is stored as transactional data in the Cloud SQL 1231 database as outlined in FIG. 12.

Tournament Attribute Information 1323 is data comprising that of described and outlined by Attribute Information 1320.

Tournament Attribute Information 1323 can be stored as historical data in in the Big Query Data Studio 1232 as shown in FIG. 12.

Tournament Attribute Information 1323 can be sent and received in real time through the Firestore Real Time Database 1233, existing in the Cloud Database 1230.

Tournament Attribute Information 1323 in one embodiment, is stored in Cloud Server 1214 shown at 2213 in FIG. 22.

The Tournament Endgame Report 2205 is compiled at 2212 and returns Tournament Attribute Information 1323 such as hit points, referring to hits the user inflicted as well as incurred while playing in an interacting gaming match shown to end at 2204 In-Game Match End.

Tournament Attribute Information 1323 in one embodiment refers to the data compiled at 2213 that is analyzed by a function in the Node.js Environment 1240 in order to determine a winner or multitude of winners in an interacting gaming match or tournament based on logic shown in FIG. 14 and FIG. 15.

Tournament Attribute Information 1323 may be queried through a function within the Node.js Environment 1240 accessed by the Admin Web Application 1211 through the Admin Module 1223 in order to manually verify the results of any match within an interacting gaming tournament shown as brackets in FIG. 20.

FIG. 14 is an embodiment illustrating a payout structure for a team based virtual or interactive gaming tournament. The number of teams 1401 able or set to participate should generally start at a number of three in an elimination style, or bracketed, virtual or interactive gaming tournament. In one embodiment, the number of payouts 1402 for a virtual or interactive gaming tournament including anywhere from three to seven teams 1407 is shown as having a payout for the first place position 1403 of 100% of the total entrance fees submitted by the participating teams.

Referring to a virtual or interactive gaming tournament including eight to eleven teams 1408, the first place payout 1403 is reduced to 70%, allowing a second place 1404 payout to be added consisting of 30% of the total entrance fees submitted by the participating teams. The percent for the first place position 1403 and second place position 1404 have the option to be variable based on the set of tools provided to the teams in orchestrating the virtual or interactive gaming tournament.

In one embodiment, a virtual or interactive gaming tournament consisting of twelve to sixteen teams 1409 has an additional payout 1402 added in represented as third place 1405. Third place 1405 is exemplified as 10%, while first place 1403 is reduced to 60% and second place 1404 is 30%.

In another embodiment, a virtual or interactive gaming tournament consisting of seventeen to nineteen 1410 teams has a payout 1402 added in for the fourth place 1406 position of 10% of the total entrance fees submitted by all teams with a third place position 1405 consisting of 15% of the total entrance fees submitted, a second place position 1404 consisting of 25% of the fees collected, and a first place position 1403 shown as 50% of the total entrance fees collected by all participating teams.

The section 1411 representing the number of teams participating in a virtual or interactive gaming tournament can be exponentially grown and determined, set, or capped (meaning setting a limit) by the team hosting the virtual or interactive gaming tournament, through the use of a team manager (e.g. team manager 1604) using the administrative management module 1213 referred to in FIG. 12.

FIG. 15 is an embodiment illustrating a payout structure for an individual based virtual or interactive gaming tournament which can best be described as a match in which every player is competing against each other. The players 1501 are shown as numbering anywhere from 2 to 139 but the number of players 1501 can be increased exponentially. In one embodiment, the number of payouts 1502 for a virtual or interactive gaming tournament or match being shown are between 2 and 5 according to how many players are included in the match. The number of payouts 1502 can be increased or decreased as the publisher sees fit.

The number of payouts 1502 for a match consisting of 2 players 1508 can either be split up with both participants receiving a payout shown as 70% of the total entrance fees for $1^{st}$ place 1503 and 30% of the total entrance fees for $2^{nd}$ place 1504 or 100% of the total entrance fees for $1^{st}$ place 1503.

The section for a match consisting of three 1509 or four 1510 players are shown with payouts corresponding to the number of players in the match. The number of payouts 1502 is variable based on the number of players 1501 in sections 1508, 1509, and 1510 which allows either the publisher or host of the virtual or interactive gaming tournament to adjust the number.

The section 1511 consisting of players 1501 from 5 to 29 is shown as having a variable number of payouts 1502 from $1^{st}$ to $5^{th}$ place which can be set by the publisher or host of the virtual or interactive gaming tournament. A payout structure only awarding $1^{st}$ place 1503 is shown as the first place finisher receiving 100% of the total fees collected from entry into the match. $2^{nd}$ place 1504, $3^{rd}$ place 1505, $4^{th}$ place 1506, and $5^{th}$ place 1507, are adjusted according to the number of payouts 1502 set for the match by the publisher or host of the virtual or interactive gaming tournament.

In another embodiment, sections including a number of players 1501 from 30-59 players 1512, 60-99 players 1513, and 100-139 players 1514 are set up the same as section 1511. The number of payouts 1502 are variable according to what the publisher or host of the virtual or interactive gaming tournament decides. Matches awarding only the $1^{st}$ place 1503 finisher are shown as awarding the finisher 100% of the total fees collected for entrance into the match. The option of awarding $2^{nd}$ 1504, $3^{rd}$ 1505, $4^{th}$ 1506, and $5^{th}$ 1507 place finishers are shown as a percent that is reduced for each position with the addition of these extra finishing positions. The host or the publisher determines how many positions will be awarded with a percent of the total entrance fees collected for the match.

Figure 16:
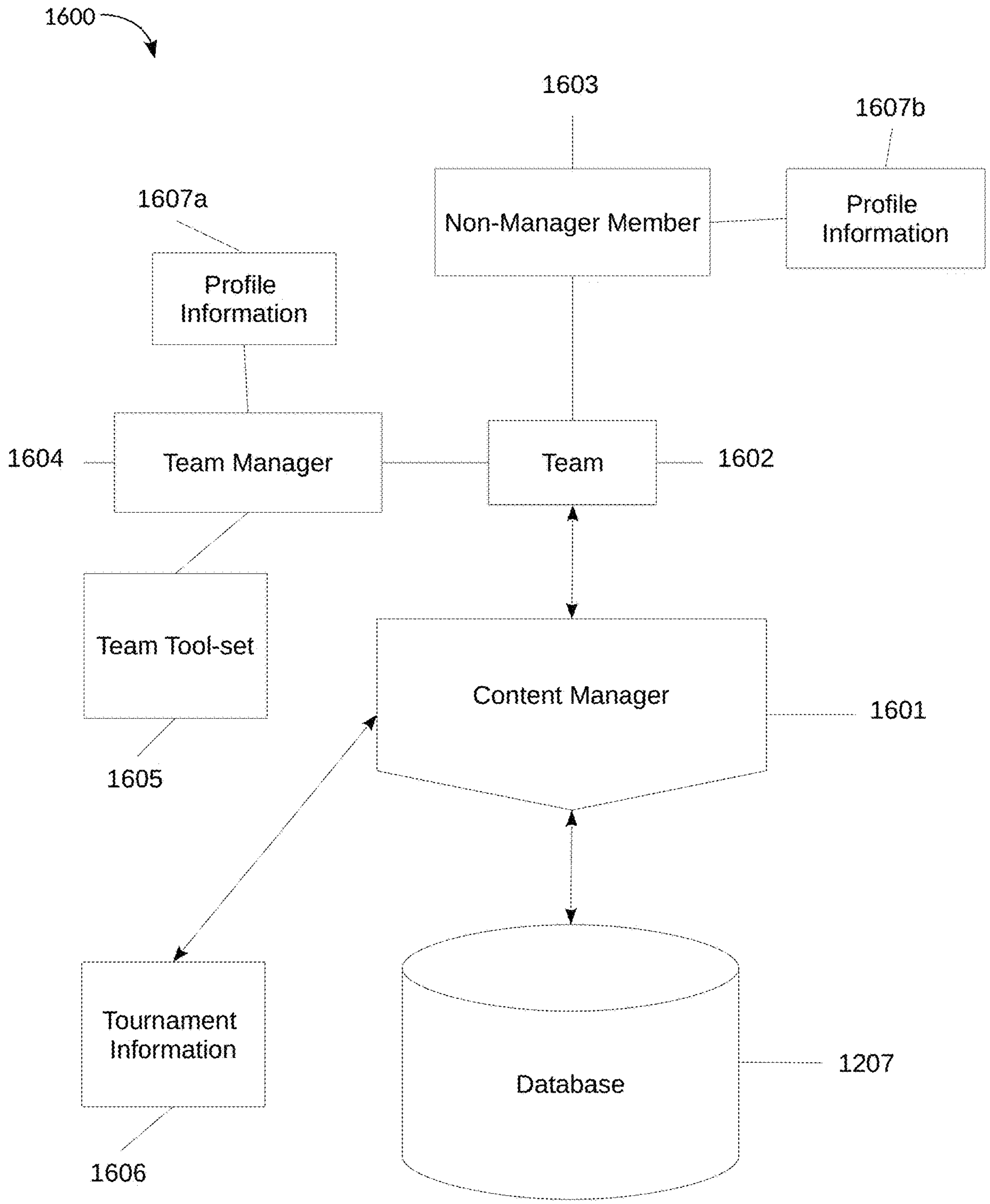
FIG. 16 illustrates an embodiment the process of and structure for teams to create and manage virtual or interactive gaming tournaments on a user level.

FIG. 16 is an embodiment illustrating the structure for teams 1602 and their ability to create and manage virtual or interactive gaming tournaments 1606 on a user level. The database 1207 stores the virtual or interactive gaming tournament information 1606, which may be a subset of the data at 1208. The virtual or interactive gaming tournament information 1606 is determined using the set of tools 1605, and is supplied to the team 1602 and managed by the team manager 1604 through the administrative management module 1213.

In some embodiments, the set of tools 1605 can include one or more of user interface processing module 1210, tournament processing module 1222, user account processing module 1221, and administrative management module 1223. The virtual or interactive gaming tournament information 1606, which in some embodiments is a subset of the data at 2206, is stored in Cloud Database 1230, and can include one or more of the cap, or limit of number of teams that can sign up for the virtual or interactive gaming tournament, the date of the virtual or interactive gaming tournament, the entrance fee for joining the virtual or interactive gaming tournament, the game being played, the number of players allotted on each team, and other information provided by the virtual or interactive gaming tournament system 1220. The virtual or interactive gaming tournament system 1220 can, via control through a user interface encompassing tools 1605, set, change, and manage virtual or interactive gaming tournament information 1606. The virtual or interactive gaming tournament information 1606, which may be a subset of the Attribute Information 1320, is displayed in launcher app 203 or Tournament Web Application 1207 for members 1603 and managers 1604 of other teams to browse and decide to join. The team manager 1604 may be the user with the power to decide which virtual or interactive gaming tournaments to join as well as when and how to host their own virtual or interactive gaming tournaments through the administrative management module 1223. The information regarding the virtual or interactive gaming tournaments as well as user and team profiles 1607*a* and 1607*b* is managed through a content manager system 1601 through tournament system 1220 (via user account processing module 1221) and stored on the server side database 1207.

The team manager 1604 may be determined by using a voting system in which the other team member's 1603 vote on which user will act as the team manager 1604. The profile information 1607 for each user includes statistics from past matches including team and personal stats that have been recorded through a combat log (e.g. reporting log files stored in 1207 referred to as 1208) that is written to cloud database 1230 and managed/accessed through launcher app 203 using the content manager 1601. Profile information 1607*a* and 1607*b*, which is a subset of Attribute Information 1320, provides a means for team managers and team members to scout and contact other players as well as compare stats from past matches.

Regarding a portion of the embodiment in which the user is classified as the team manager 1604, the team members profile information 1607*a* is stored in the publisher or hosts Cloud Server 1214, their status as team manager will appear on other client devices in the graphical user interface as a means for other team managers and players to contact them using a method such as an email system or other method mentioned herein. Likewise with the other team members 1603, referring to clients that do not have the title of team manager, their status will show up in their profile information 1607*b*, accessible to other clients and shown on other client or players graphical user interface displays using launcher app 203 described herein.

FIG. 17 illustrates an embodiment of a flowchart depicting the process for hosting an interactive gaming tournament by a team, or group of users, through the use of a manager 1604, voted in by users of launcher app 203 participating as members of the team. The hardware and interaction between modules used is described in FIG. 12 and FIG. 13.

The user, in this case the team manager 1604 referred to in FIG. 16, starts by logging into the application 1701, also referred to as launcher app 203, using the verified credentials entered on signing up for the application service using the interactive forms downloaded from the publisher, or hosts website or similar source, stored in database 1207.

In an embodiment where launcher app 203 is designated for hosting a virtual or interactive gaming tournament 1702, the user proceeds to start the process of hosting a virtual or interactive gaming tournament 1703. If the user has gotten to this point and does not wish to proceed, they are directed back to the main form in launcher app 203.

In order to host a virtual or interactive gaming tournament, the user must be on a team, or group of users with a similar goal acting on behalf of each other. If the user 2101 or 2201 is not on a team, text is displayed as a message 1712 that conveys the message that they must belong to a team as described in 1602 and the user, or client, is directed back to the main form in launcher app 203.

Once the user is verified as belonging to a team, they are then checked for the status, through an automatic query of Cloud Database 1230, of being the designated manager for the aforementioned team 1705. The data signifying team manager is referred to in 1607*a*, being a subset of 1320. If the user is not the manager for the team hosting the virtual or interactive gaming tournament, a message is displayed 1713 in a window or form, conveying this information through text on the graphical user interface, and the user is redirected back to the main form of the application 1702, also referred to as launcher app 203.

Once the user has been verified to be the manager of the team that wants to host a virtual or interactive gaming tournament, a method of inputting the virtual or interactive gaming tournament information is prompted on the users device and the user proceeds to fill out the information in a graphical user interface display 1706 that shows up in launcher app 203, on the device 1306-1309, in which they are using to access launcher app 203.

Once the information is entered on the users device in the graphical user interface display, the user is prompted to double check that the information is correct through another display 1707 relaying the information entered and displaying it in the same fashion as will show up in launcher app 203 for other teams to view and enter.

If the information entered into the form is entered correctly and the confirm button that is displayed in the form on the users device is selected, a confirmation 1708 is sent to the other team members as a means for all members to be informed and aware of the virtual or interactive gaming tournament they are entering. This confirmation can be sent through the launcher app 203 built in messaging service as well as to each team members email address that is collected upon sign-up and stored in the server side database hosted by the publisher of launcher app 203. If the user deems the information incorrect when it is displayed back to them in 1707, which may be in the form of text in a window displayed on the graphical user interface display, they are prompted to go back to the form 1706 in order to re-enter the information.

Once all team members 1603 have received the confirmation message and their response is stored in the server side database 1207 as being "yes" or the equivalent of "yes" 1710, or as a 1 in binary, the virtual or interactive gaming tournament attribute information 1323 is posted in the specified form in launcher app 203 for other teams to access, view, and join using the graphical user interface displayed on their own devices 1306-1309, using launcher app 203 installed on their computer or other device running the application mentioned above.

If a team member 1603 from the team hosting the virtual or interactive gaming tournament declines or does not respond to the message sent 1709 through launcher app 203's built in messaging service and/or email provided on sign-up to the service described herein, and stored in the server side database 1207, a message is sent to the team manager 1711 through the messaging service and to their email informing them of the team member that has declined or has not accepted the confirmation message with a reasonable amount of time decided by the publisher of launcher app 203 or team manager 1604 using the administrative management module 1213 mentioned herein. At this point, the manager 1604 of the team 1602 can decide to exclude the member that has declined or has not responded to the confirmation message by contacting them directly, or they can work to resolve whatever issue the declining team member may have. Essentially they will be doing the work of a manager, which is their title.

Figure 18:
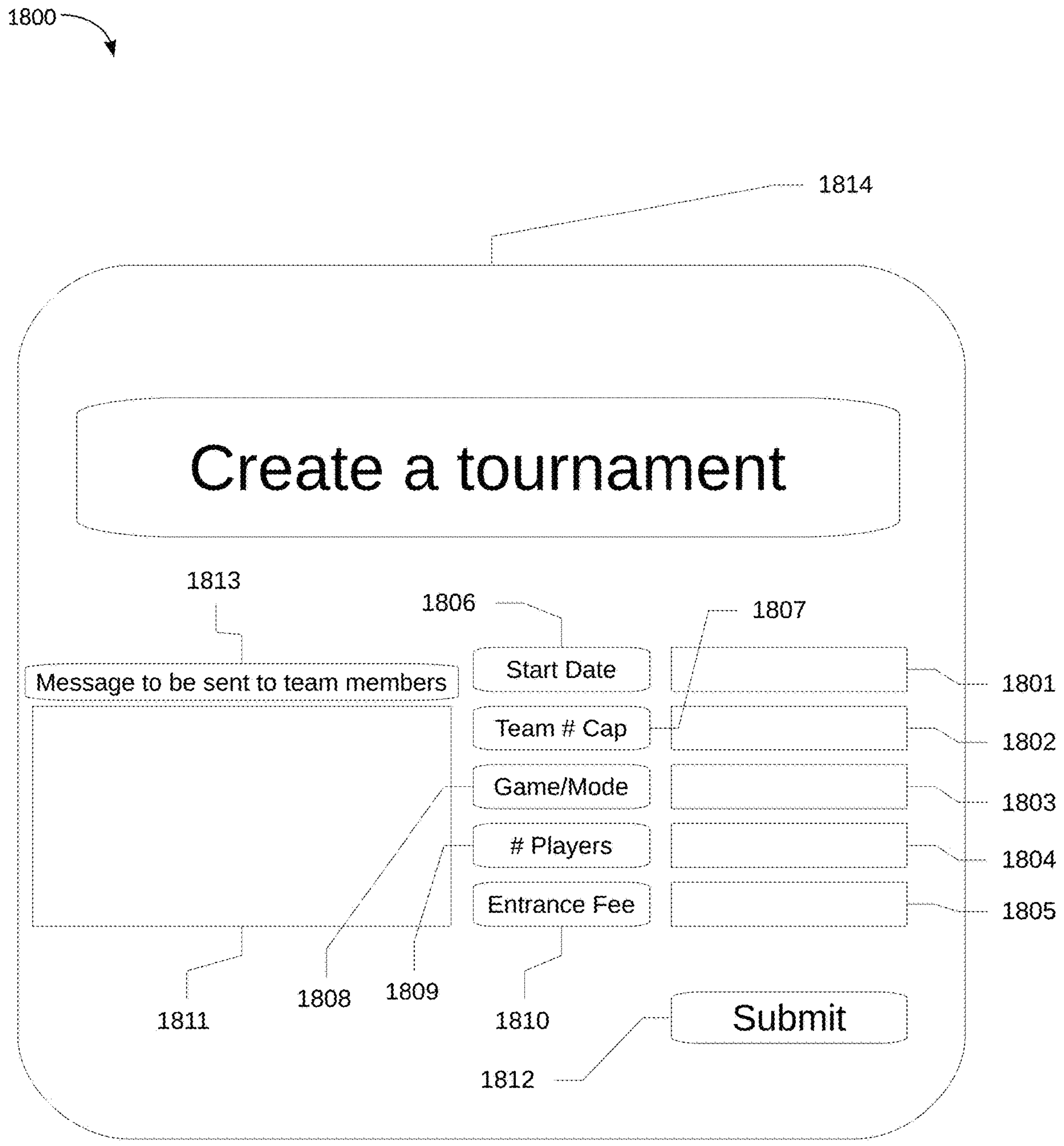
FIG. 18 illustrates an embodiment of a graphical user interface display of a form used to create virtual or interactive gaming tournaments.

FIG. 18 illustrates an embodiment of a section of launcher app 203, referred to as Tournament Web Application 1207, a form 1804 displayed in a graphical user interface display used by team managers 1604 in creating virtual or interactive gaming tournaments outlined in 1209 (see also, FIG. 12 and FIG. 16). Several text boxes are shown 1801, 1802, 1803, 1804, and 1805, that provide a place for the team manager to enter in information pertaining to the labels directly parallel and to the left of the text boxes 1806, 1807, 1808, 1809, and 1810.

The text box 1801 provides a place for the client, or user, acting as the team manager to enter the desired start date 1806 of the virtual or interactive gaming tournament. The start can be displayed in a drop down menu as well as from a list of available dates decided on by the publisher or host of the interactive gaming tournament server. The information or data entered is stored as text on the users device until the submit button 1812 is clicked, after which a confirmation appears, which can be displayed as a message containing text, that is outlined in FIG. 17, and the information is then stored in the server side, or publishers server, database, as well as posted in a form displayed to other teams 1602 and users through the use of launcher app 203's graphical user interface in the form or window specified for this purpose.

The text box 1802 provides a place for the client acting as the team manager to enter the desired number of teams 1807 able to participate in the virtual or interactive gaming tournament. The information or data entered is stored as text on the users device until the submit button 1812 is clicked, after which a confirmation appears that is outlined in FIG. 17, and the information is then stored in the server side, or publishers server, database, as well as posted in a form displayed to other teams and users.

The text box 1803 provides a place for the client acting as the team manager to enter the desired game mode 1808 such as king of the hill, team death match, or another mode made available by the publisher of launcher app 203, to be the basis of game-play for the virtual or interactive gaming tournament. The information or data entered is stored as text on the users device until the submit button 1812 is clicked, after which a confirmation appears that is outlined in FIG. 17, and the information is then stored in the server side, or publishers server, database, as well as posted in a form displayed to other teams and users.

The text box 1804 provides a place for the client acting as the team manager to enter the desired number of players 1809 allotted to each team of the virtual or interactive gaming tournament. The information or data entered is stored as text on the users device until the submit button 1812 is clicked, after which a confirmation appears that is outlined in FIG. 17, and the information is then stored in the server side, or publishers server, database, as well as posted in a form displayed to other teams and users. The number of players can be limited by the publisher according to the game mode selected or entered in the designated text box 1803 displayed on the users screen.

The text box 1805 provides a place for the client acting as the team manager to enter the desired entrance fee 1810 required to be paid in order to join the virtual or interactive gaming tournament. The information or data entered is stored as text on the users device until the submit button 1812 is clicked, after which a confirmation appears that is outlined in FIG. 17, and the information is then stored in the server side, or publishers server, database, as well as posted in a form displayed to other teams and users.

Once the information described above 1801-1805 is entered on the users form through launcher app 203 installed on their device 1306-1309, such as a personal computer, and the submit button 1812 is interacted with, meaning the user has selected it, a personal message is sent to the team members as described in reference to FIG. 17. This personal message is given a section with a header such as 1813, which is typed out and initially displayed on the user's page 1811. This can include information that the team manager deems necessary to convey to other team members regarding the virtual or interactive gaming tournament. The message typed 1811 is sent over a WAN, intranet, internet, or other web based service using the launcher app 203's built in messaging service using protocols decided on by the publisher 206, as well as sent to the email addresses provided by each associated team member 1603 upon sign-up. A copy of the message is stored in the publisher's databases 1207 and 1600*b* to be accessed for future use.

Figure 19:
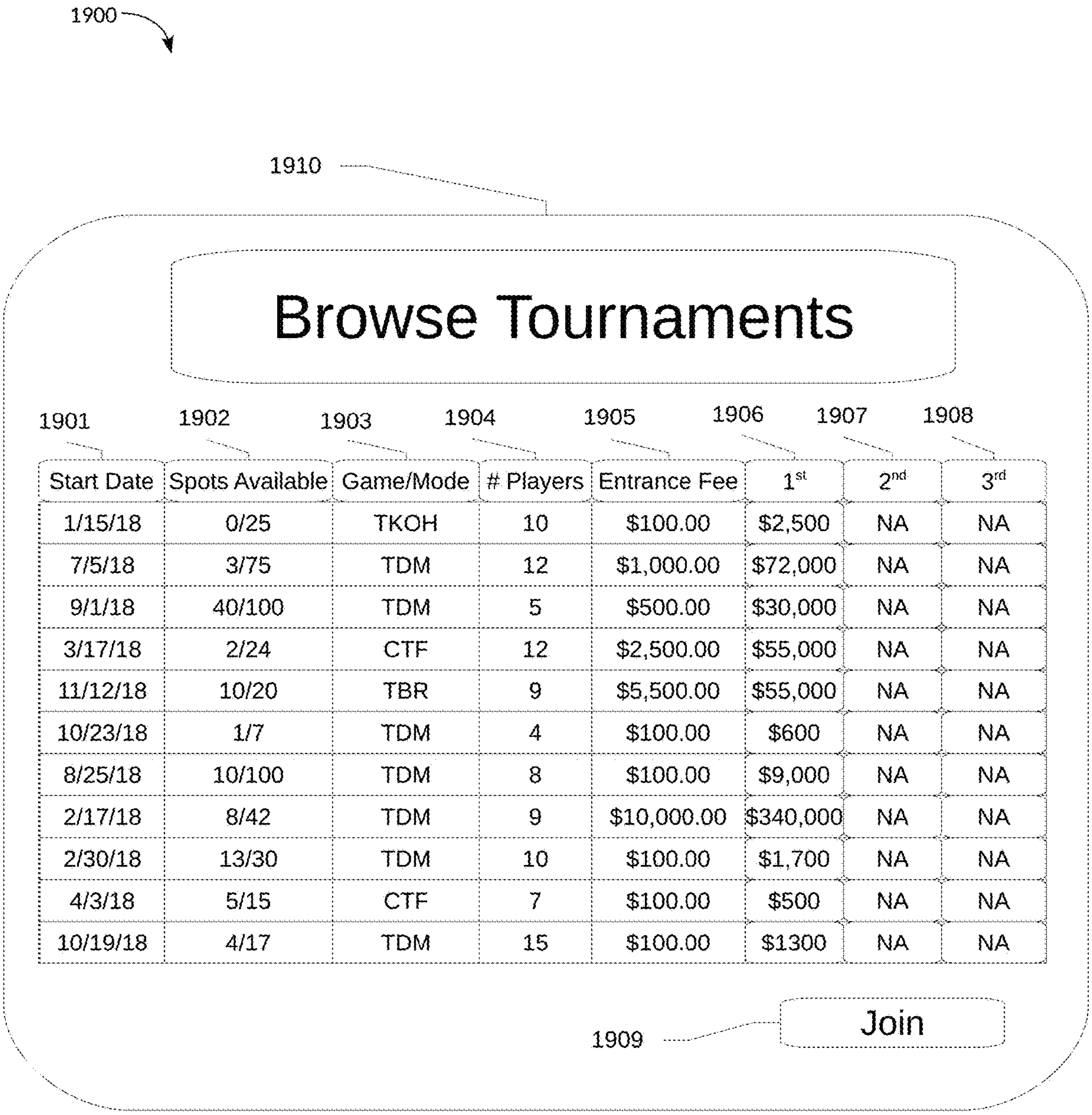
FIG. 19 illustrates an embodiment of a graphical user interface display of an interface that teams and users browse when selecting a virtual or interactive gaming tournament to join.

FIG. 19 illustrates an embodiment of a graphical user interface display of an interface 1910, being a section of launcher app 203 or Tournament Web Application 1207, that team members 1604 and 1603, and other users browse when selecting a virtual or interactive gaming tournament to join. The information displayed in FIG. 19 is retrieved from the publisher's server side database 1230, using a form of internet connection depending on the service each client is accessing the data network 1202 on, described herein.

The start date 1901 is displayed vertically and is dependent on the start date entered in FIG. 18 by the team manager 1604 in creating the virtual or interactive gaming tournament. The section displaying spots available 1902 refers to the number of team slots available for the corresponding interactive gaming match, set by the team manager 1604 through the embodiment illustrated in FIG. 18 under the designated section 1802. For instance, if the team manager sets the team number cap 1807 as 10 and 5 teams have signed up, the spots available 1902 will appear as 5/10 or 5 out of 10. The section displaying game type or game mode 1903 in a vertical column on the users graphical user interface display through launcher app 203 downloaded from the publisher's website, is dependent on the data entered by the team manager in FIG. 18 in the designated section 1803. Game mode can refer to a specific game or a mode such as team death-match, capture the flag, king of the hill, or another mode made available by the publisher 206 of launcher app 203 or decided on by the team manager 1604. The section labeled # Players 1904 refers to the allowed number of players for each team set by the team manager outlined in the embodiment illustrated in FIG. 18 at the designated section 1804. The number of players 1904 is displayed in a vertical column on the users graphical user interface display through launcher app 203 which has been installed on the clients device 1306-1309, such as a personal computer or similar device and accessed through the a data network 1209 such as the internet. The entrance fee 1905 refers to the fee measured in a monetary value such as the American dollar, bitcoin, Euro, or similar currency translated to be specific to the client's location or set in the settings form displayed in launcher app 203. The entrance fee 1905 is set by the virtual or interactive gaming tournament creator's team manager in the embodiment illustrated in FIG. 18 in the designated section 1805. The section pertaining to the entrance fee 1905 is displayed in a vertical column on the users graphical user interface display through launcher app 203 which has been installed on the clients device 1306-1309, such as a personal computer or similar device and accessed through the clients network such as the internet. The payment API will determine the location and currency used in the designated section 1905.

Sections displaying the prizes for first 1906, second 1907, and third 1908 place finishing teams are displayed in vertical columns on the users graphical user interface display through launcher app 203, downloaded from the publishers 206 website and installed on the users device such as a personal computer or other gaming device. The monetary values in these sections 1906-1908, are updated as more teams join the virtual or interactive gaming tournament, based on spots available 1902 and the entrance fee 1905. The updated prizes in monetary value are outlined in FIG. 14.

When a team manager, acting on behalf of their team, selects a virtual or interactive gaming tournament to join, the join button 1909, is interacted with, meaning the user will select or click the button 1909 while the desired virtual or interactive gaming tournament is highlighted on their graphical user interface display through launcher app 203.

The information provided in 1910 can be expanded on as deemed necessary by the publisher 206 of launcher app 203, accounting for new information which team managers 1604 could use to help facilitate virtual or interactive gaming tournaments, referring primarily to stage 2. The information displayed on the users graphical user interface display in one embodiment 1910, is accessed through launcher app 203 which has been downloaded over a network 1202 such as the internet and retrieved from cloud database 1230 from attribute information 1320 that has been entered by the team manager as outlined in FIG. 17 and FIG. 18.

FIG. 20 is an embodiment illustrating the layout for a bracket style tournament of the virtual or interactive gaming type illustrated in 1209, allowing users 2201 and 2202, which can be referred to as players, playing on their own or participating within a team, or group of users with the similar goal of winning the virtual or interactive gaming tournament, to compete against each other over a system of networks including the internet. The embodiment provides a layout for a virtual or interactive gaming tournament consisting of eight teams represented as 2001, 2002, 2003, 2004, 2007, 2008, 2009, and 2010. The number of teams in the illustration are not limited to the number in the illustration, but instead depend on the number of teams that join the interactive or virtual gaming tournament as well as the cap (number of allowed teams), set by the team manager, in creating the interactive or virtual gaming tournament on behalf of their team.

In the illustration, seven matches, or competitions between the teams, are outlined that lead to one eventual winner of the interactive or virtual gaming tournament 2015.

In reference to round 1 at 2016, team 2001 plays a match against team 2002, the winner of which is represented as 2005. Team 2003 plays a match against team 2004, the winner of which is represented as 2006. In reference to round 1 at 2017, team 2007 plays a match against team 2008, the winner of which is represented as 2011. Team 2009 plays a match against team 2010, the winner of which is represented as 2012.

Round 2 at 2018 consists of the winners from round 1 2016, as illustrated at 2005 and 2006, and competing in an interactive gaming match to advance to the next round, represented at 2014. Round 2 at 2019 consists of the winners from round 1 2017, as illustrated at 2011 and 2012, and competing in an interactive gaming match to advance to the next round, represented at 2013.

An illustration of the final round in the embodiment 2000 is shown at 2020 and illustrates a virtual gaming match between team 2014 and team 2013. The winner of the virtual gaming match 2015 is the winner of the interactive or virtual gaming tournament.

FIG. 21 illustrates a sequence diagram of a process for accepting payments in the platform described herein when the User 2101 decides to join a tournament using the ERA Tournament Web Application 1207 as shown in FIG. 12. The diagram in FIG. 21 is illustrated at 2100 and includes user devices 1201 or a plurality of User Devices shown as 1202, 1203, 1204, and 1205 defined in FIG. 12. 1200 is comprised of a User side 2101 and System Side 2102. User 2101 consists of the physical hardware and interaction that the physical user has with said hardware such as devices 1202, 1203, 1204, 1205.

The primary function defined by User 2101 is that in which the user is interacting with the User Interface 2103 through the manipulation of pixels on the graphical user interface of the device 1201 being used.

The manipulation of pixels described above most commonly takes place on the ERA Tournament Web Application 1207 defined in FIG. 12 and shown in FIG. 21 at 2109.

In various embodiments, system 2102 can be system 2202 as illustrated in FIG. 22.

In other embodiments, system 2102 can be a distributed system wherein one or more services and associated information stored in memory can be distributed among a plurality of systems such as system 2202 or Cloud Server 1214.

At 2110, a user identifies a tournament request inquiry at User Interface 2103 and submits the new service request inquiry from user device 1201 through User Interface 2103 to system 2102 through the manipulation of pixels shown on User Interface 2103 using the ERA Tournament Web Application 1207.

In the illustrated embodiment, a return tournament request inquiry 2110 fetches content referred to as Tournament Attribute Information 1323 shown in FIG. 13 stored in the Cloud Database 1230 or similar database comprising 1231, 1232, and 1233.

Tournament Selection Process 2104 is comprised of systems and services described throughout.

In one embodiment, Tournament Selection 2104 is defined as the process in which the User 2101 is interacting with the Join Game Service shown in FIG. 13 at 1318 by the manipulation of pixels shown on the single page web application referred to as ERA Tournament Web Application 1207.

Tournament Attribute Information 1323 is returned at 2111 through the Tournament Processing Module referred to in FIG. 12 as 1222 and more specifically defined in FIG. 13 as Join Game Service 1318.

Initiate Join Tournament Request 2112 shows the direction of interaction between the User 2101 as described above with a part of System 2102 referred to as Join Tournament 2105.

Join Tournament 2105 refers to a process in FIG. 21 in which the User 2101 has made a decision as to which tournament they want to join from the list displayed on User Interface 2103.

The list of Tournaments referred to above is compiled based on Tournament Attribute Information 1323 and shown at 2111.

Authenticate User Request 2113 shows the direction of interaction between the User 2101 through means described above, once they have picked an interactive gaming tournament or match to join, and Authenticate 2106.

Authenticate 2106 is the process in FIG. 21 in which the User 2101, through the use of User Device 1201, is interacting with any part of the Authentication Service 1308 shown in FIG. 13 and referenced throughout.

Return Authentication Results 2114 shows the direction of interaction between Cloud Database 1230 and Authenticate 2106.

Return Authentication Results 2114 returns data over a data network such as the Data Network 1209 that has been requested by Authentication Service 1308.

The data returned at 2114 in one embodiment consists of any form of Attribute Information outlined in 1320.

The data returned at 2114 in one embodiment refers to real time data stored in the Firestore Real Time Database 1233.

Access Granted to Payment Acceptance Platform 2115 shows the direction of interaction between Authenticate 2106 and Payment Acceptance Platform 2107 once approval has been granted based on a series of Single Authentication 1309 or Double Authentication 1310 services that have been run in the User Processing Module 1221 used to verify the integrity of the User 2101 associated with the account accessing ERA Tournament Web Application 1207 through User Interface 2103.

Payment Acceptance Platform 2107 references any interaction the User 2101 as described above, has with Payment Platform 1238.

In one embodiment, Payment Acceptance Platform 2107 comprises part of Payment Input 1304.

Payment Acceptance Platform 2107 most commonly deals with entrance fees to interactive gaming matches and tournaments in a bracket style as outlined in FIG. 20 which are considered part of Tournament Attribute Information 1323.

Initiate Payment 2116 shows the direction of interaction between the Cloud Database 1230 and Payment Acceptance Platform 2107 once payment is confirmed by the User 2101.

Initiate Payment 2116 is comprised of a script in node.js environment 1240 that debits a form of bank account such as a checking account or digital wallet based on the corresponding Tournament Attribute Information 1323 defined as the price of entry to the interactive gaming tournament or match.

Initiate Payment 2116 is comprised of Payment API 1227, Payment Platform 1238, and Payment Input 1304.

Store Payment Information 2117 shows the direction of interaction between Payment Acceptance Platform 2107 and Cloud Database 1230 once Payment has been verified by the Payment Platform 1238 associated with Payment Input 1304.

In one embodiment, Payment Platform 1238 dealing with Payment Input 1304 is an External Network Resource 1235 called Bluefin.

Store Payment Information 2117 in one embodiment is stored as transactional data in Cloud Database 1230 comprising that of Payment Attribute Information 1322.

Initiate Messaging Service 2118 refers to the direction of interaction between Payment Acceptance Platform 2107 and Cloud Database 1230 after Initiate Payment 2116.

Initiate Messaging Service 2118 is comprised of Messaging Service 1218, and run in the Node.js environment 1240.

Initiate Messaging Service 2118 in one embodiment can be comprised of SMS 1306 and in another embodiment Email 1307.

Message User 2119 refers to the direction of interaction between Messaging Service 1218 and User Interface 2103.

Message User 2119 is comprised of the process in which the User is sent a message based on Player Attribute Information 1321, Payment Attribute Information 1322, and Tournament Attribute Information 1323.

Message User 2119 in one embodiment is comprised of an SMS 1306 or Email 1307 being sent to the Player Attribute Information 1321 defined as mobile phone number or email address stored in Cloud Database 1230 upon sign up as described throughout.

In-Game Match 2108 refers to the interaction User 2101 has with the interactive gaming content hosted on Game Server 1237 defined in FIG. 12.

In-Game Match 2108 in other embodiments, can be accessed through Game API 1225 in order to send and receive data that can be configured in another embodiment through Admin Module 1223.

Join Interactive Gaming Match 2120 refers to the direction of interaction between the User Interface 2103 being accessed by User 2101 and In-Game Match 2108.

Join Interactive Gaming Match 2120 can take place immediately after 2119 or any set amount of time after 2119 has concluded up to one year.

Join Interactive Gaming Match 2120 is comprised of the Game API in connecting User 2101 to Game Server 1236.

FIG. 22 Illustrates an embodiment of a process in which a user as defined throughout exits an interactive gaming tournament or match.

The process shown in FIG. 22 details interactions between user 2201 and objects within system 2202.

User 2201 is defined in one embodiment as User 2101 in FIG. 21.

User 2201 is comprised of User Device 2203 which is known as User Device 1201 in another embodiment.

In various embodiments, system 2202 can be system 2102 as illustrated in FIG. 21.

In other embodiments, system 2202 can be a distributed system wherein one or more services and associated information stored in memory can be distributed among a plurality of systems such as system 2202 or Cloud Server 1214.

User Device 2203 in one embodiment is the same as User Device 1201 being comprised of 1202, 1203, 1204, and 1205.

In-Game Match End 2204 in FIG. 22 is the process in which User 2201 reaches the end of an interactive gaming match or tournament as defined by a bracket tournament style as shown in FIG. 20 and occurring as a part of Game Server 1236.

n-Game Match End 2204 is comprised of components in Tournament System 1220.

External Connecting API's 1224 such as Game API 1225 are used to facilitate the transfer of data within In-Game Match End 2204 and other objects within System 2202.

Tournament Endgame Report 2205 refers to an object within System 2202 whose function in one embodiment is to compile transactional and real time data 2206 defined by Tournament Attribute Information 1323, Player Attribute Information 1321, and Payment Attribute Information 1322.

Tournament Endgame Report 2205 is executed in Node.js Environment 1240 and contains components of Tournament Processing Module 1222 such as Reporting Service 1317, Join Game Service 1318, and End Game Service 1319 as defined in FIG. 13.

Data 2206 in one embodiment consists of username, time of game, type of match, game being played, match or tournament entry fee, play position in ranking outlined in FIG. 14 and FIG. 15, hit points against the user in question, defined as hits by opposing players, and hit points carried out on opposing users by the User 2201 associated with the user account defined as different sets of Attribute Information 1320.

Payment Distribution Platform 2207 exists as a component of Payment Output 1305 existing in System 2202.

Payment Distribution Platform 2207 in one embodiment refers to the process of distributing prize pool winnings to User 2201.

Prize pool winnings are determined based on logic used in FIG. 14 and FIG. 15 to determine which User 2201 out of a multitude of users is awarded the prize pool as determined by Tournament Attribute Information 1323.

Tournament Attribute Information 1323 in this embodiment consists of the number of users assigned to a tournament as outlined being bracket style in FIG. 20, the tournament date, organizer name, and other information stored both as historical and real time data on Cloud Server 1214.

User Ends the Game 2211 is referring to the direction of interaction between User Device 2203 and In-Game Match End 2204.

User Ends the Game 2211 in one embodiment refers to the conclusion of an interactive gaming tournament consisting of one or more interactive gaming matches as described in Game Server 1236.

2211 in one embodiment refers to the conclusion of a final match in a series of interactive gaming matches as described in FIG. 20.

Match Triggers Compiling of in-game data shown at 2212 as the interaction between In-Game Match End 2204 and Tournament Endgame Report 2205.

Compiling of in-game data 2212 refers to the collection of Player Attribute Information 1321 and Tournament Attribute Information 1322.

Compiling of in-game data 2212 is utilized to determine a winner of the interactive gaming match or series of matches such as a bracket style tournament outlined in FIG. 20.

Compiling of in-game data 2212 is handled by Tournament Processing Module 1222 through services including Reporting Service 1317 and End Game Service 1319.

Compiling of in-game data 2212 in one embodiment utilizes Game API 1225 to receive Tournament Attribute Information 1323 within Node.js environment 1240.

Results Returned to Database 2213 refers to the direction and interaction between Tournament Endgame Report 2205 and Cloud Server 1214.

The end game report that is compiled at 2212, consisting of different types of Attribute Information 1320, can be sent as historical or transactional data to any subset of Cloud Database 1230.

Historical data is most commonly sent to Big Query Data Studio 1232. Transactional data is most commonly sent to Cloud SQL 1231.

Initiate Authentication Process 2214 refers to the interaction and direction of interaction between Cloud Server 1214 and Authentication Service 1308 once the compiled end game report has been sent to Cloud Server 1214.

Initiate Authentication Process 2214 is comprised of Authentication Service 1308 which interacts with Node.js environment 1240 on Cloud Server 1214.

Authentication Process Triggers Messaging Service 2215 shows the direction and interaction of Authentication Service 1308 and Messaging Service 1218.

Authentication Process Triggers Messaging Service 2215 refers to the point in the process of User 2201 being distributed prize pool winnings once the End Game Service 1319 has returned the Tournament Endgame Report 2205 as Data 2206 to Cloud Server 2214.

Messaging Service 2216 refers to the direction and interaction between Messaging Service 1218 and Cloud Database 1214.

Messaging Service 2216 being utilized alongside Messaging Service 1218 in one embodiment is a feature of Authentication Service 1308, being used to verify the integrity of the account, referring to Attribute Information 1320 associated with User 2201.

Messaging Service 2216 can be comprised of SMS 1306 or Email 1307.

Request to Update Attribute Information 2217 shows the direction and interaction between Attribute Information 1321 and Cloud Server 1214.

Request to Update Attribute Information 2217 is comprised of Messaging Service 1218 sending Attribute Information 1320 to the Cloud Database 1230 over a data network such as 1209.

In one embodiment, Update Attribute Information 2218 shows the interaction and direction of interaction between Attribute Information 1320 and Cloud Server 1214.

Update Attribute Information 2218 is comprised of Attribute Information 1320 being sent and receive over Data Network such as 1209 to Cloud Server 1214.

Firestore Real Time Database 1233 in one embodiment is used to facilitate the storing of Data 2206 in Node.js Environment 1240.

Request Payment Platform Access 2219 refers to the interaction and direction of interaction between Cloud Server 1214 as described above and Payment Distribution Platform 2207.

Request Payment Platform Access 2219 is used in place of Request Payment Platform Access 2219 if Single Authentication 1309 is utilized in place of Double Authentication 1310 as a means to verify the integrity of Attribute Information 1320 associated with the Data Set 2206 tied to the User 2201 account stored in Cloud Database 1230 or a subset of Cloud Database 1230.

Request Payment Platform Access 2219B refers to an alternate option to Request Payment Platform Access 2219.

Request Payment Platform Access 2219B is run on services similar to 2219 but is used when Double Authentication 1310 is utilized in place of or alongside Single Authentication 1309.

Request Payment Platform Access 2219B in one embodiment exists as a script in the Node.js environment.

Initiate Authentication Process 2220 refers to the interaction and direction of interaction between Payment Distribution Platform 2207 and Authentication Service 1308.

Initiate Payment Process 2220 is comprised as a function that takes place in order to facilitate the transfer of funds, defined as digital or virtual currency or goods having monetary value, from the account containing the prize pool, which is the total value of the culmination of entrance fees, or Attribute Information 1320, paid by a multitude of Users 2202 competing in a bracket style interactive gaming tournament or match as described throughout.

Return Authentication Result 2221 refers to the interaction between Authentication Service 1308 and Cloud Server 1214.

Return Authentication Result 2221 utilizes a function of Authentication Service 1308 in order to verify the integrity of Attribute Information 1320 associated to the Data Set 2206 tied to the account of User 2201 attempting to be distributed prize pool money as described above.

Return Authentication Result 2221 in one embodiment refers to Attribute Information 1320 being sent over a Data Network such as 1209 as Data 2206 in the form of transactional data to Cloud SQL 1231 and as historical data to Big Query Data Studio 1323.

Return to Payment Process 2222 refers to the interaction and direction of interaction between Cloud Server 1214 and Payment Distribution Platform 2207 between 2221 and 2223.

Return to Payment Process 2222 in one embodiment occurs after the integrity of the Attribute Information 1230 associated with the User 2201 tied to the account accessing the Tournament Web Application 1207 over a Data Network such as 1209 is verified through Authentication Service 1308.

Return to Payment Process 2222 is the point at which the prize pool as described throughout, is distributed to the bank account, digital wallet, or other form of digital storage of items of monetary value associated with the account of User 2201.

Return to Payment Process 2222 is facilitated through the use of Payment Output 1305 referred to in FIG. 13 and being a child entity or subset of Payment Platform 1238.

Request Messaging Service 2223 refers to the interaction and direction of interaction between Payment Distribution Platform 2207 and Messaging Service 1218.

Request Messaging Service 2223 occurs after Payment Output 1305 has distributed prize pool funds to the User 2201 or Multitude of Users 2201, who has been verified as the winner based on a script run in the Node.js Environment 1240 which has compiled the Tournament Endgame Report as Attribute Information 1230.

In one embodiment, the User 2201 or multitude of Users 2201 confirmed through Authentication Service 1308 to be the winner of the interactive gaming tournament as outlined in FIG. 14 and FIG. 15, is determined through App Engine 1240 analyzing Data 2206 referred to as Attribute Information 1230.

Submit Message to Database 2224 refers to the interaction and direction of interaction between Messaging Service 1218 and Cloud Server 1214.

Submit Message to Database 2224 is comprised of a copy of SMS 1306 or Email 1307, that is sent to the user at 2225 confirming transfer, or distribution of prize pool funds into their account, being stored as historical data in Big Query Data Studio 1232.

Message Sent to User 2225 refers to the interaction and direction of interaction between Messaging Service 1218 and User 2201.

Message Sent to User 2225 is comprised of an SMS 1306 or Email 1307 confirming the distribution or transfer of funds as described above defined as interactive gaming match or tournament prize pool winnings or earnings, which contains Attribute Information 1230 which includes Tournament Attribute Information 1323 pertaining to the Data Set 2206 associated with the specific tournament or match that User 2201 competed in and won. Message Sent to User 2225 is compiled in Node.js Environment 1240 and based on Attribute Information.

A method, described herein and comprising an embodiment including the necessary software and process, run on hardware described herein, for a user or team to create and manage their own interactive or virtual gaming tournament/s through a selected user, acting or referred to as a team manager 1604, who can participate in the match along with their team, controlling the buy-in, tournament date, number of teams able to participate, tournament statistics, payout, etc.

Embodiments described herein provide the means necessary through a computer-readable storage device and comprising instructions that when executed by a processor, for a user, referred to as a player or participant, to be voted in by other users of the same team and act on behalf of the users grouped together in a team 1602.

A system comprising the necessary embodiment for users to create teams, which have the ability to appoint managers and browse other team and/or user statistics and profiles through the application run on hardware that facilitates the transfer of data from the publisher, or hosts server to the client device described herein.

A computer program product embodied in a computer-readable storage device and comprising instructions that when executed by a processor, cause the processor to provide a buy-in system which is an embodiment including hardware described herein for individuals or groups of individuals referred to as teams, to access software including a payment API that facilitates the ability to buy into an interactive or virtual gaming match, with a payout described in FIG. 15 and FIG. 16 based on the finishing placement of the user or team, based on skill in the game being played and the buy-in, which can be set by the publisher or host of the interactive or virtual gaming tournament described herein.

A system comprising an embodiment including the necessary software, run on hardware described herein, for users or teams to browse information related to and join interactive or virtual gaming tournaments which have been created by other teams or users using the application provided, run on the publisher or hosts server.

An embodiment described herein, compatible and dependent on a payment API in controlling the teams' funds, which changes when the team joins an interactive gaming match based on the fees and aforementioned details.

An embodiment described herein, compatible and dependent on a payment API that controls the teams' funds, which changes based on the outcome of an interactive gaming match or tournament described herein.

A method, described herein and comprising an embodiment including the necessary software and process, run on hardware described herein, for a user, referred to as a player or participant, to browse a list of and join an interactive gaming match with an entrance fee, competing against other users, with the incentive of winning a prize measured in monetary value based on the number of users in the match and the entrance fee in joining the match.

A system described herein for displaying interactive gaming matches sorted by price points for the user, referred to as a participant or player in an interactive gaming tournament or match, to join.

An embodiment described herein, compatible and dependent on a payment API that controls the users' funds, which changes when the user joins an interactive gaming match based on the fees and aforementioned details.

An embodiment described herein, compatible and dependent on a payment API that controls the users' funds, which changes based on the outcome of an interactive gaming match described herein.

An embodiment illustrated herein provides a monitoring tool for parents or guardians of children under 18 years of age, to allot money and/or set limits on what they are able to spend on interactive gaming tournaments or matches.

As a means to combat the stigma some people may feel towards interactive gaming as a career, the embodiment illustrated herein provides a tool for parents or guardians of children under 18 years of age to monitor the funds going in and out of their child's account as a means to see if they are making money or losing money in the profession of interactive gaming.

Although the various graphical user interface displays provided by the example embodiments described herein are widely varied, the descriptions of the graphical user interface displays and sequences are provided herein to describe various features of the disclosed embodiments. These user interface displays and sequences are described herein with reference to example embodiments. Equivalent user interface displays and sequences can be implemented within the space of the inventive subject matter disclosed and described herein.

Spatially relative terms such as "under", "below", "lower", "over", "upper" and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method, comprising:

submitting, over a network, from a user device that is associated with a user to a content server that includes one or more processors and a memory, a tournament request inquiry, wherein the tournament request inquiry includes information identified or entered by the user via a Graphical User Interface (GUI) on the user device;

generating, by the one or more processors, interactive gaming match content from the memory of the content server in response to receiving the tournament request inquiry from the user device, wherein the interactive gaming match content includes payment attribute information that identifies an entrance fee for each one of a number of players per team for at least one gaming match and tournament attribute information that identifies a game server and a number of team spots available for each one of the at least one gaming match, wherein the interactive gaming match content that includes the payment attribute information and the tournament attribute information is sent, over the network, by the one or more processors to the user device;

selecting, by the user, from the interactive gaming match content displayed on the GUI of the user device, the game server for one of the at least one gaming match and sending, over the network, from the user device to the content server, an entrance request that identifies the selected game server, the one of the at least one gaming match and a selected entrance fee to be paid for at least one of the each one of the number of players per team for the one of the at least one gaming match;

sending, over the network, by the one or more processors, from the content server to a third-party payment platform, a request for validation from the third-party payment platform in response to the content server receiving the entrance request from the user device; and sending, over the network by the one or more processors, match population content from the content server to the selected game server that includes the at least one of the each one of the number of players per team in response to receiving validation content from the third-party payment platform, wherein the validation content includes confirmation that a user account associated with the user contains funds that are equal to or greater than the selected entrance fee for the at least one of the each one of the number of players per team for the one of the at least one gaming match associated with the selected game server.

2. The method of claim 1, wherein the tournament attribute information includes for the each one of the at least one gaming match, a payout amount.

3. The method of claim 1, wherein sending, over the network by the one or more processors, the match population content from the content server to the selected game server further comprises sending, over the network by the one or more processors, the match population content from the content server to the selected game server for the one of the at least one gaming match, via a built-in game API for the one of the at least one gaming match hosted on the selected game server, the match population content for one or more additional ones of user devices associated with one or more additional user.

4. The method of claim 1, wherein sending, over the network, by the one or more processors, from the content server to the third-party payment platform, the request for validation to the third-party payment platform further comprises the user device returning a return response over the network to the third-party payment platform in response to a request confirmation sent from the third-party payment platform over the network to the user device, wherein the return response is identified or entered by the user via the GUI on the user device, wherein the request confirmation includes the one of the at least one gaming match associated with the selected game server and serves as an acknowledgment and agreement by the user from the user device that the user is joining the one of the at least one gaming match identified by the entrance request.

5. The method of claim 4, further comprising the third-party payment platform sending a response verification over the network to the content server after the third-party payment platform has received the return response from the user device which verifies the user device is joining the match identified by the entrance request.

6. The method of claim 1, wherein the user device receives the interactive gaming match content over the network from the content server and sends the entrance request over the network to the content server via a cloud-based web application that is hosted by the content server.

7. The method of claim 1, wherein the user device receives the interactive gaming match content over the network from the content server and sends the entrance request over the network to the content server via an application that is hosted on the user device.

8. The method of claim 1, wherein the one or more processors are hosted on one or more cloud servers that communicate with the user device via a data network that includes, but is not limited to, a wide area network (WAN), the one or more cloud servers or an intranet connection.

9. A computer program product embodied in a computer-readable storage device and comprising instructions that when executed by a processor, cause the processor to:

receive, over a network, from a user device that is associated with a user by a content server that includes the processor and a memory, a tournament request inquiry, wherein the tournament request inquiry includes information identified or entered by the user via a Graphical User Interface (GUI) on the user device;

generate interactive gaming match content from the memory of the content server in response to receiving the tournament request inquiry from the user device, wherein the interactive gaming match content includes payment attribute information that identifies an entrance fee for each one of a number of players per team for at least one gaming match and tournament attribute information that identifies a game server and a number of team spots available for each one of the at least one gaming match, wherein the interactive gaming match content that includes the payment attribute information and tournament attribute information is sent, over the network, by the processor to the user device;

selecting, by the user, from the interactive gaming match content displayed on the GUI of the user device, the game server for one of the at least one gaming match and sending, over the network, from the user device to the content server, an entrance request that identifies the selected game server, the one of the at least one gaming match and a selected entrance fee to be paid for at least one of the each one of the number of players per team for the one of the at least one gaming match;

send, over the network, by the processor, from the content server to a third-party payment platform, a request for validation from the third-party payment platform in response to the content server receiving the entrance request from the user device; and send, over the network, by the processor, match population content from the content server to the selected game match server that includes the at least one of the each one of the number of players per team in response to receiving validation content from the third-party payment platform, wherein the validation content includes confirmation that a user account associated with the user contains funds that are equal to or greater than the selected entrance fee for the at least one of the each one of the number of players per team for the one of the at least one gaming match associated with the selected game server.

10. The computer program product of claim 9, wherein the tournament attribute information includes for the each one of the at least one gaming match, a payout amount.

11. The computer program product of claim 9, wherein sending, over the network by the processor, the match population content from the content server to the selected game server further comprises sending, over the network by the processor, the march population content from the content server to the selected game server for the one of the at least one game match, via a built-in game API for the one of the at least one gaming match hosted on the selected game server, the match population content for one or more additional ones of user devices associated with one or more additional users.

12. The computer program product of claim 9, wherein sending over the network, by the processor, from the content server to the third-party payment platform, the request for validation to the third-party payment platform further comprises the user device returning a return response over the network to the third-party payment platform in response to a request confirmation sent from the third-party payment platform over the network to the user device, wherein the return response is identified or entered by the user via the GUI on the user device, wherein the request confirmation includes the one of the at least one gaming match associated with the selected game server and serves as an acknowledgment and agreement by the user from the user device that the user is joining the one of the at least one gaming match identified by the entrance request.

13. The computer program product of claim 9, further comprising the third-party payment platform sending a response verification over the network to the content server after the third-party payment platform has received the return response from the user device which verifies the user device is joining the match identified by the entrance request.

14. The computer program product of claim 9, further comprising the user device receiving the interactive gaming match content over the network from the content server and sending the entrance request over the network to the content server via a cloud-based web application that is hosted by the content server.

15. The computer program product of claim 9, further comprising the user device receiving the interactive gaming match content over the network from the content server and sending the entrance request over the network to the content server via an application that is hosted on the user device.

16. A system comprising:

one or more processors; and one or more memory elements including instructions that when executed cause the one or more processors to:

receive, over a network, from a user device that is associated with a user by a content server that includes the one or more processors and the one or more memory elements, a tournament request inquiry, wherein the tournament request inquiry includes information identified or entered by the user via a Graphical User Interface (GUI) on the user device;

generate interactive gaming match content from the one or more memory elements of the content server in response to receiving the tournament request inquiry from the user device, wherein the interactive gaming match content includes payment attribute information that identifies an entrance fee for each one of a number of players per team for at least one gaming match and tournament attribute information that identifies a game server and a number of team spots available for each one of the at least one gaming match, wherein the interactive gaming match content that includes the payment attribute information and tournament attribute information is sent, over the network, by the one or more processors to the user device;

selecting, by the user, from the interactive gaming match content displayed on the GUI of the user device, the game server for one of the at least one gaming match and sending, over the network, from the user device to the content server, an entrance request that identifies the selected game server, the one of the at least one gaming match and a selected entrance fee to be paid for at least one of the each one of the number of players per team for the at least one gaming match;

send, over a network, by the processor, from the content server to a third-party payment platform, a request for validation from the third-party payment platform in response to the content server receiving the entrance request from the user device; and send, over the network, by the one or more processors, match population content from the content server to the selected game match server that includes the at least one of the each one of the number of players per team in response to receiving validation content from the third-party payment platform, wherein the validation content includes confirmation that a user account associated with the user contains funds that are equal to or greater than the selected entrance fee for the at least one of the each one of the number of players per team for the one of the at least one gaming match associated with the selected game server.

17. The system of claim 16, wherein the tournament attribute information includes for the each one of the at least one gaming match, a payout amount.

18. The system of claim 16, wherein sending, over the network by the one or more processors, the match population content from the content server to the selected game server further comprises sending, over the network by the one or more processors, the match population content from the content server to the selected game server for the one of the at least one game match via a built-in game API for the one of the at least one gaming match hosted on the selected game server, the match population content for one or more additional ones of user devices associated with one or more additional users.

19. The system of claim 16, wherein sending, over the network, by the one or more processors, from the content server to the third-party payment platform, the request for validation to the third-party payment platform further comprises the user device returning a return response over the network to the third-party payment platform in response to a request confirmation sent from the third-party payment platform over the network to the user device, wherein the return response is identified or entered by the user via the GUI on the user device, wherein the request confirmation includes the one of the at least one gaming match associated with the selected game server and serves as an acknowledgment and agreement by the user from the user device that the user is joining the one of the at least one gaming match identified by the entrance request.

20. The system of claim 16, further comprising the third-party payment platform sending a response verification over the network to the content server after the third-party payment platform has received the return response from the user device which verifies the user device is joining the match identified by the entrance request.

* * * * *